United States Patent

Yamaguchi et al.

Patent Number: 5,993,666
Date of Patent: *Nov. 30, 1999

[54] MALEIC ACID BASED COPOLYMER, AND ITS PRODUCTION PROCESS AND USE

[75] Inventors: Shigeru Yamaguchi, Himeji; Keishi Tsuboi, Akashi; Yoshio Irie, Himeji, all of Japan

[73] Assignee: Nippon Shokubai Co., Ltd., Osaka, Japan

[*] Notice: This patent is subject to a terminal disclaimer.

[21] Appl. No.: 09/003,882

[22] Filed: Jan. 7, 1998

Related U.S. Application Data

[62] Division of application No. 08/277,528, Jul. 19, 1994, Pat. No. 5,733,857.

[30] Foreign Application Priority Data

| Jul. 20, 1993 | [JP] | Japan | 5-178946 |
| Mar. 18, 1994 | [JP] | Japan | 6-049375 |
| Jun. 2, 1994 | [JP] | Japan | 6-121578 |

[51] Int. Cl.$^6$ .................................................. C02F 5/10
[52] U.S. Cl. .................... 210/698; 210/701; 252/180; 510/247
[58] Field of Search ............................ 510/361, 434, 510/476, 533, 247; 252/180; 210/698, 701, 699, 700

[56] References Cited

U.S. PATENT DOCUMENTS

| 3,624,048 | 11/1971 | Blumbergs et al. | 525/327.5 |
| 3,850,832 | 11/1974 | Wegemund et al. | 252/99 |
| 3,865,793 | 2/1975 | Bruson et al. | 526/271 |
| 3,887,480 | 6/1975 | Rue et al. | 252/135 |
| 4,009,110 | 2/1977 | Topfl et al. | 252/8.9 |
| 4,519,920 | 5/1985 | Fukumoto et al. | 210/701 |
| 4,589,995 | 5/1986 | Fukumoto et al. | 252/180 |
| 4,600,524 | 7/1986 | Cuisia et al. | 252/181 |
| 4,659,793 | 4/1987 | Yang | 526/91 |
| 4,740,314 | 4/1988 | Kneller | 210/701 |
| 4,871,823 | 10/1989 | Billman et al. | 526/272 |
| 4,906,397 | 3/1990 | Leighton et al. | 252/174.24 |
| 4,980,088 | 12/1990 | Boeckh et al. | 252/546 |
| 5,055,540 | 10/1991 | Hughes et al. | 526/318.2 |
| 5,064,563 | 11/1991 | Yamaguchi et al. | 526/91 |
| 5,135,677 | 8/1992 | Yamaguchi et al. | 252/180 |
| 5,175,361 | 12/1992 | Denzinger et al. | 562/590 |
| 5,259,985 | 11/1993 | Nakanishi et al. | 252/180 |
| 5,298,570 | 3/1994 | Tahara et al. | 525/329 |
| 5,733,857 | 3/1998 | Yamaguchi et al. | 510/361 |

FOREIGN PATENT DOCUMENTS

| 359055A2 | 3/1990 | European Pat. Off. . |
| 3233776A1 | 3/1984 | Germany . |
| 58-67706 | 4/1983 | Japan . |
| 59-64613 | 4/1984 | Japan . |
| 59-213714 | 12/1984 | Japan . |
| 62-021893 | 1/1987 | Japan . |
| 62-218407 | 9/1987 | Japan . |
| 2120399 | 5/1990 | Japan . |
| 32167 | 1/1991 | Japan . |
| 314046 | 2/1991 | Japan . |
| 3124711 | 5/1991 | Japan . |
| 51121 | 1/1993 | Japan . |

*Primary Examiner*—Ardith Hertzog
*Attorney, Agent, or Firm*—Roylance, Abrams, Berdo & Goodman, L.L.P.

[57] ABSTRACT

A maleic acid-based copolymer is provided which has a weight-average molecular weight of 1,000 to 100,000, a calcium ion-capturability of 300 mgCaCO$_3$/g or higher calculated as calcium carbonate, and a clay-dispersibility of 1.2 or higher. Another maleic acid-based copolymer is also provided which has a level of adsorption to clay within the range of 20 to 90% and a calcium ion-stabilization degree constant of 4.0 or larger. These copolymers are obtainable by a process including the steps of: charging maleic acid and/or its salt (A) into a reaction vessel, in such a manner that the concentration of the (A) will be 35% by weight or higher; adding hydrogen peroxide into the vessel after the charging step, in such a manner that the amount of hydrogen peroxide is within the range of 3 to 20% by weight of the (A); and adding a water-soluble ethylenically unsaturated monomer (B) into the vessel after the charging step and within 30 to 500 minutes after initiation of a reaction, in such a manner that the ratio (A)/(B) is within the range of 95/5 to 5/95 in mol ratio, wherein the adding of the monomer (B) is completed 10 to 300 minutes later than completion of the step of adding hydrogen peroxide. The copolymers are used for detergent compositions, inorganic pigment-dispersing agents, water-treating agents and fiber-treating agents.

15 Claims, No Drawings

MALEIC ACID BASED COPOLYMER, AND ITS PRODUCTION PROCESS AND USE

This application is a divisional application of Ser. No. 08/277,528, filed Jul. 19, 1994 now U.S. Pat. No. 5,733,857 which is hereby incorporated by reference in its entirety.

TECHNICAL FIELD

The present invention relates to a maleic acid-based copolymer, a detergent composition containing the copolymer, a production process of the copolymer, and use of the copolymer obtainable by the production process.

BACKGROUND ART

A maleic acid-based copolymer having many carboxyl groups has so far been known to show superior chelating and dispersing effects, and is used in various fields with respect to detergent compositions, dispersing agents, cohering agents, scale inhibitors, chelating agents, fiber-treating agents, washing agents and the like.

Japanese Official Patent Gazette No. Heisei 3-2167 gives an example of use of a maleic acid-based copolymer as a pigment-dispersing agent, wherein the copolymer is produced by the steps of: charging a maleic acid component into a reaction vessel; beginning dropwise addition of acrylic acid and an aqueous hydrogen peroxide solution simultaneously; finishing the dropwise addition of these materials simultaneously; and thereby copolymerizing maleic acid and acrylic acid at a pH of 3.5 to 5.0. However, the maleic acid-based copolymer obtainable by this process contains a large amount of low molecular weight oligomer components. In addition, although a large amount of hydrogen peroxide is used for polymerization, a large amount of maleic acid remains in a reaction solution when the polymerization has finished. Moreover, hydrogen peroxide also remains in a large amount.

Also, Japanese Official Patent Provisional Publication No. Showa 62-218407 gives an example of use of a maleic acid-based copolymer as a dispersing agent and as a detergent composition. It is hard to say that the detergent composition described in this publication has washing power higher than conventional detergent compositions. The detergent composition described in the publication does not have desirable performance as a detergent in good balance. In the publication, a maleic acid-based copolymer is produced by the steps of: charging a maleic acid component into a reaction vessel; beginning dropwise addition of acrylic acid and an aqueous hydrogen peroxide solution simultaneously; finishing the dropwise addition of these materials simultaneously; and thereby copolymerizing maleic acid and acrylic acid while maintaining pH at about 4 to about 6. The obtained maleic acid-based copolymer contains a large amount of low molecular weight impurities. In addition, although a large amount of hydrogen peroxide is used for polymerization, a large amount of maleic acid remains in a reaction solution when the polymerization has finished. Moreover, hydrogen peroxide also remains in a large amount.

Furthermore, Japanese Official Patent Gazette No. Heisei 3-14046 shows that copolymers of ethylenically unsaturated mono- and dicarboxylic acids are used as outside film formation inhibitors for detergents and for washing agents. These copolymers are produced by the steps of: charging an ethylenically unsaturated dicarboxylic acid component into a reaction vessel; beginning dropwise addition of an ethylenically unsaturated monocarboxylic acid component and an aqueous hydrogen peroxide solution simultaneously; and finishing the dropwise addition of these materials simultaneously. However, the polymers obtained in this reaction are not copolymers which contain maleic acid at a high content and which have many carboxylic groups in their molecules. In addition, the polymers obtained contain a large amount of low molecular weight oligomers and deteriorate washability upon mud dirt when used as detergent compositions.

The present inventors studied about what physical properties of maleic acid-based copolymers are important for enhancing the washing power of detergent compositions containing the maleic acid-based copolymers. As a result, the inventors found that it is important to enhance calcium ion-capturability and clay-dispersibility of the maleic acid-based copolymers, and also found that it is important, to high level washing for the removal of mud dirt, that the maleic acid-based copolymers have both of a calcium ion-stabilization degree constant and a level of adsorption to clay particles within particular ranges. The inventors further found that since, when water having a high hardness is used, maleic acid-based copolymers having a high gelatability become insoluble and thereby greatly weaken their washing power, it is important to lower the gelatability of maleic acid-based copolymers.

Maleic acid-based copolymers obtained under conventional reaction conditions contain hydrogen peroxide at a high concentration and residual maleic acid in a large amount, and are insufficient with respect to the calcium ion-capturability, clay-dispersibility and gelatability (which are important to the enhancement of the washing power of detergent compositions). In addition, the calcium ion-stabilization degree constant, the level of adsorption to clay particles, and the gelatability are also unsatisfactory.

DISCLOSURE OF THE INVENTION

OBJECTS OF THE INVENTION

It is an object of the present invention to provide a maleic acid-based copolymer which has a high calcium ion-capturability, a good clay-dispersibility and a low gelatability.

It is another object of the present invention to provide a detergent composition which has a high washing power and a well balanced washability upon both mud dirt and oil dirt.

It is also another object of the present invention to provide a maleic acid-based copolymer which has a calcium ion-stabilization degree constant within a preferable range, a good level of adsorption to clay, and a low gelatability.

It is also another object of the present invention to provide a detergent composition which has a high washing power upon mud dirt.

It is also another object of the present invention to provide a process for producing a maleic acid-based copolymer, wherein the amount of residual monomers and the amount of residual initiators are both small at the end of polymerization and wherein the productivity is high.

SUMMARY OF THE INVENTION

As to a maleic acid-based copolymer of the present invention, its calcium ion-capturability and clay-dispersibility are defined. This copolymer has a weight-average molecular weight of 1,000 to 100,000, a calcium ion-capturability of 300 mgCaCO$_3$/g or higher calculated as calcium carbonate, and a clay-dispersibility of 1.2 or higher.

It is preferable that the weight-average molecular weight is within the range of 3,000 to 15,000, that the calcium ion-capturability is 350 mgCaCO$_3$/g or higher, and that the clay-dispersibility is 1.4 or higher.

It is more preferable that the calcium ion-capturability is 400 mgCaCO$_3$/g or higher and that the clay-dispersibility is 1.4 or higher.

It is the most preferable that the calcium ion-capturability is 450 mgCaCO$_3$/g or higher and that the clay-dispersibility is 1.5 or higher.

It is preferable that the gelatability of the maleic acid-based copolymer is 0.2 or lower.

A detergent composition of the present invention includes:

a maleic acid-based copolymer having a defined calcium ion-capturability and a defined clay-dispersibility, wherein the weight-average molecular weight is within the range of 1,000 to 100,000, wherein the calcium ion-capturability is 300 mgCaCO$_3$/g or higher calculated as calcium carbonate, and wherein the clay-dispersibility is 1.2 or higher; and a surfactant.

It is preferable that the combined amount of the maleic acid-based copolymer is 0.1 to 20% by weight of the total of the detergent composition, and that the combined amount of the surfactant is 5 to 70% by weight of the total of the detergent composition.

It is more preferable that the detergent composition of the present invention includes:

0.5 to 15% by weight of the maleic acid-based copolymer having a weight-average molecular weight of 3,000 to 15,000, a calcium ion-capturability of 350 mgCaCO$_3$/g or higher and a clay-dispersibility of 1.4 or higher; and 20 to 60% by weight of the surfactant.

It is preferable that the gelatability of the maleic acid-based copolymer contained in the detergent composition of the present invention is 0.2 or lower.

As to a maleic acid-based copolymer of the present invention, the calcium ion-stabilization degree constant is defined at 4.0 or larger, and the level of adsorption to clay is defined within the range of 20 to 90%.

As to this maleic acid-based copolymer, it is preferable that the weight-average molecular weight is within the range of 1,000 to 100,000, that the level of adsorption to clay is within the range of 30 to 70%, and that the calcium ion-stabilization degree constant is within the range of 4.2 to 6.0.

It is more preferable that the level of adsorption to clay is within the range of 40 to 60%, and that the calcium ion-stabilization degree constant is within the range of 4.5 to 5.5.

A detergent composition of the present invention includes:

a maleic acid-based copolymer having a defined calcium ion-stabilization degree constant and a defined level of adsorption to clay, wherein the calcium ion-stabilization degree constant is 4.0 or larger, and wherein the level of adsorption to clay is within the range of 20 to 90%; and a surfactant.

It is preferable that the combined amount of the maleic acid-based copolymer is 0.1 to 20% by weight of the total of the detergent composition, and that the combined amount of the surfactant is 5 to 70% by weight of the total of the detergent composition.

It is more preferable that in the detergent composition of the present invention, the weight-average molecular weight of the maleic acid-based copolymer is within the range of 1,000 to 100,000, the level of adsorption of the copolymer to clay is within the range of 30 to 70%, and the calcium ion-stabilization degree constant of the copolymer is within the range of 4.2 to 6.0.

It is more preferable that the detergent composition of the present invention includes:

0.5 to 15% by weight of the maleic acid-based copolymer, wherein the level of adsorption to clay is within the range of 40 to 60%, and wherein the calcium ion-stabilization degree constant is within the range of 4.5 to 5.5; and 20 to 60% by weight of the surfactant.

It is preferable that the gelatability of the maleic acid-based copolymer contained in the detergent composition of the present invention is 0.2 or lower.

The process of the present invention for producing a maleic acid-based copolymer includes the steps of:

charging a material (A) into a reaction vessel, in such a manner that the concentration of the material (A) will be 35% by weight or higher, wherein the material (A) is maleic acid and/or its salt;

adding hydrogen peroxide into the reaction vessel after the above-mentioned charging step, in such a manner that the amount of hydrogen peroxide is within the range of 3 to 20% by weight of the material (A); and adding a water-soluble ethylenically unsaturated monomer (B) into the reaction vessel after the above-mentioned charging step and within 30 to 500 minutes after initiation of a reaction, in such a manner that the ratio (A)/(B) is within the range of 95/5 to 5/95 in mol ratio, wherein the adding of the monomer (B) is completed 10 to 300 minutes later than completion of the above-mentioned step of adding hydrogen peroxide.

In the step of adding hydrogen peroxide, it is preferable that hydrogen peroxide is added into the reaction vessel for 20 to 170 minutes. In the step of adding the monomer, it is preferable that the water-soluble ethylenically unsaturated monomer (B) is added into the reaction vessel for 30 to 180 minutes.

It is more preferable that the production process of the present invention further includes a step of adding sodium persulfate into the reaction vessel after the above-mentioned charging step.

It is the most preferable that the production process of the present invention further includes a step of charging a metal compound or a metal into the reaction vessel, in such a manner that the amount of polyvalent metal ions will be within the range of 0.1 to 100 ppm of the entire amount of a reaction liquid contained in the reaction vessel.

A detergent composition of the present invention includes:

a maleic acid-based copolymer being obtainable by the above-mentioned production process; and a surfactant.

An inorganic pigment-dispersing agent of the present invention includes a maleic acid-based copolymer being obtainable by the above-mentioned production process.

A water-treating agent of the present invention includes a maleic acid-based copolymer being obtainable by the above-mentioned production process.

A fiber-treating agent of the present invention includes:

a maleic acid-based copolymer being obtainable by the above-mentioned production process; and at least one selected from the group consisting of dyeing agents, peroxides and surfactants.

DETAILED DESCRIPTION OF THE INVENTION (Maleic acid-based copolymer):

Whether the maleic acid-based copolymer of the present invention is (1) one having a defined calcium ion-capturability and a defined clay-dispersibility, or (2) one having a defined level of adsorption to clay and a defined calcium ion-stabilization degree constant, the copolymer is not especially limited so long as it is a copolymer obtainable by a polymerization reaction including maleic acid and/or its salt as a monomer component (hereinafter, the term "maleic acid and/or its salt" is abbreviated as "maleic acid (salt)"). As a monomer component other than the maleic acid (salt), preferred is a water-soluble ethylenically unsaturated monomer.

As examples of the water-soluble ethylenically unsaturated monomer, there can be cited unsaturated monocarboxylic acids such as acrylic acid, methacrylic acid, α-hydroxyacrylic acid and crotonic acid and any salt thereof; unsaturated polycarboxylic acids such as fumaric acid, itaconic acid, citraconic acid and aconitic acid and any salt thereof; vinyl acetate; and the like.

In addition, as an example of the water-soluble ethylenically unsaturated monomer, there can be cited a compound shown by the following general formula:

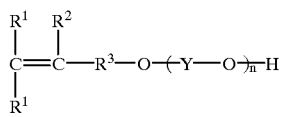

(1)

where:
- $R^1$ and $R^2$, independently of each other, denote a hydrogen atom or a methyl group and are not simultaneously methyl groups;
- $R^3$ denotes $-CH_2-$, $-(CH_2)_2-$ or $-C(CH_3)_2-$;
- the total number of carbon atoms contained in $R^1$, $R^2$ and $R^3$ is 3;
- Y denotes an alkylene group having 2 to 3 carbon atoms; and
- n is 0 or an integer of 1 to 100.

As examples of the compound of the formula (1), there can be cited hydroxyl group-containing unsaturated monomers such as 3-methyl-3-buten-1-ol (isoprenol), 3-methyl-2-buten-1-ol (prenol), 2-methyl-3-buten-2-ol (isoprene alcohol) and monomers formed from additive reactions of 1 to 100 mol of ethylene oxide and/or propylene oxide to 1 mol of those monomers.

In addition, as another example of the water-soluble ethylenically unsaturated monomer, there can be cited a compound shown by the following general formula:

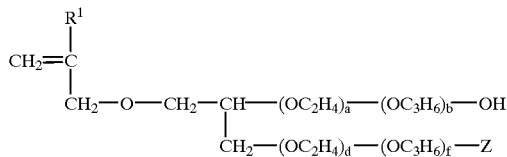

(2)

where:
- $R^1$ denotes a hydrogen atom or a methyl group;
- a, b, d and f, independently of each other, denote 0 or an integer of 1 to 100, wherein a+b+d+f is 0 to 100;
- the units $-OC_2H_4-$ and $-OC_3H_6-$ may be bonded with each other in any order; and
- Z denotes a hydroxyl group, a sulfonic acid group or a phosphorous or phosphoric acid group in the case where d+f is 0, alternatively Z denotes a hydroxyl group in the case where d+f is a positive integer of 1 to 100.

As examples of the compound of the formula (2), there can be cited 3-allyloxy-2-hydroxypropanesulfonic acid and any salt thereof; (meth)allyl ether-based unsaturated monomers such as glycerol monoallyl ether and monomers formed from additive reactions of 1 to 100 mol of ethylene oxide and/or propylene oxide to 1 mol of glycerol monoallyl ether; sulfonic acid group-containing unsaturated monomers such as vinylsulfonic acid, allylsulfonic acid, methallylsulfonic acid, styrenesulfonic acid, 2-acrylamido-2-methylpropanesulfonic acid, sulfoethyl (meth)acrylate, sulfopropyl (meth)acrylate, 2-hydroxysulfopropyl (meth) acrylate and sulfoethylmaleimide and any salt thereof; terminal alkyl group-containing ester-based unsaturated monomers such as (i) monoesters of alcohols with (meth) acrylic acid, crotonic acid and the like or (ii) monoesters, any salt thereof or diesters formed from reactions of alcohols with maleic acid, fumaric acid, itaconic acid, citraconic acid, aconitic acid and the like, wherein the alcohols are those formed from additive reactions of 0 to 100 mol of ethylene oxide and/or propylene oxide to allcyl alcohols having 1 to 20 carbon atoms; ester-based unsaturated monomers such as (i) monoester-based monomers formed from additive reactions of 1 to 100 mol of ethylene oxide and/or propylene oxide to 1 mol of unsaturated carboxylic acid monomers including (meth)acrylic acid, crotonic acid and the like, or (ii) monoesters, any salt thereof or diesters formed from additive reactions of 1 to 100 mol of ethylene oxide and/or propylene oxide to 1 mol of unsaturated carboxylic acid monomers including maleic acid, fumaric acid, itaconic acid, citraconic acid, aconitic acid and the like. The water-soluble ethylenically unsaturated monomer may be any mixture of at least two monomers selected from the group consisting of the above-mentioned monomers. The most preferable water-soluble ethylenically unsaturated monomer is (meth)acrylic acid (salt).

The maleic acid-based copolymer of the present invention is that obtainable by optional processes. Especially preferred is a maleic acid-based copolymer obtainable by the later-mentioned production process including copolymerizing maleic acid (salt) and the above-mentioned water-soluble ethylenically unsaturated monomer in an aqueous medium using hydrogen peroxide as a water-soluble polymerization initiator. It is more preferable that the maleic acid-based copolymer of the present invention has a narrow molecular weight distribution of polymers and contains high molecular weight components into which a large amount of maleic acid is introduced.

(Calcium ion-capturability and clay-dispersibility):

The weight-average molecular weight of the maleic acid-based copolymer of the present invention is preferably within the range of 1,000 to 100,000. In view of improving calcium ion-capturability and clay-dispersibility, it is more preferably within the range of 2,000 to 50,000, still more preferably 3,000 to 30,000, and most preferably 3,000 to 15,000.

The calcium ion-capturability of the maleic acid-based copolymer of the present invention is defined as milligrams of calcium ions which are captured by 1 g of the copolymer and calculated as calcium carbonate, The calcium ion-capturability is an index which shows how many calcium ions are captured in water by the maleic acid-based copolymer. The surfactant is unsolubilized when it combines with calcium ions in water. However, if the maleic acid-based copolymer having a high calcium ion-capturability is used together with the surfactant, the unsolubilization of the surfactant is inhibited and the effects upon the improvement in washing power become high.

The calcium ion-capturability is 300 mgCaCO₃/g or higher, preferably 350 mgCaCO₃/g or higher, more preferably 400 mgCaCO₃/g or higher, still more preferably 450 mgCaCO₃/g or higher; which is a value calculated as calcium carbonate captured by 1 g of the copolymer. The higher the calcium ion-capturability of the maleic acid-based copolymer is, the higher the abilities as a detergent builder of the copolymer are.

The clay-dispersibility of the maleic acid-based copolymer of the present invention is defined as the absorbancy measured under the following conditions.

Conditions for measuring clay-dispersibility:
Vessel: 100 cc measuring cylinder
Polymer solution: 1 cc of a 0.5% (calculated as a solid content) aqueous polymer solution+100 g of supply water of Himeji-city, Japan
Clay: 1.0 g of Amazon clay
Stirring period: 10 minutes (using a magnetic stirrer)
Stationary standing period: 18 hours
Measurement method: 10 cc of an uppermost portion of the solution in the measuring cylinder is sampled, its absorbancy (ABS) for 380 nm ultraviolet rays (UV) is measured using a 1 cm cell, and the obtained numerical value is taken as the clay-dispersibility.

The clay-dispersibility is an index which shows a degree of effect upon the removal and uniform dispersion of mud dirt and the like to inhibit precipitates of clay during washing. To sufficiently obtain such an effect, it is necessary that the clay-dispersibility is 1.2 or higher. In addition, to inhibit settlement and attachment of mud dirt, the clay-dispersibility is preferably 1.4 or higher, more preferably 1.5 or higher.

The clay-dispersibility is a numerical value for evaluating a degree of dispersion of clay in the presence of the polymer by turbidity of a supernatant when a suspension in which clay is dispersed is allowed to stand stationary for a defined period. Larger numerals show higher dispersibility as follows:

1.5 or higher: the clay-dispersibility is very good.
1.4 to 1.5, but excluding 1.5: the clay-dispersibility is particularly good.
1.2 to 1.4, but excluding 1.4: the clay-dispersibility is good.
0.5 to 1.2, but excluding 1.2: the clay-dispersibility is poor.
Lower than 0.5: the clay-dispersibility is very poor.

The calcium ion-capturability and clay-dispersibility of the maleic acid-based copolymer of the present invention need to satisfy the below-mentioned condition ①. It is preferable, that the detergent composition containing the maleic acid-based copolymer has an ability to balance an effect upon the dispersion of mud dirt with an effect upon the removal of oil dirt by inhibiting unsolubilization of a surfactant, contained in the detergent composition, by capturing calcium ions. Accordingly, the following conditions ②, ③, ④, ⑤, ⑥, ⑦, ⑧ and ⑨ become more and more preferable in this order.

① The calcium ion-capturability is 300 mgCaCO₃/g or higher, and the clay-dispersibility is 1.2 or higher.
② The calcium ion-capturability is 350 mgCaCO₃/g or higher, and the clay-dispersibility is 1.2 or higher.
③ The calcium ion-capturability is 400 mgCaCO₃/g or higher, and the clay-dispersibility is 1.2 or higher.
④ The calcium ion-capturability is 450 mgCaCO₃/g or higher, and the clay-dispersibility is 1.2 or higher.
⑤ The calcium ion-capturability is 350 mgCaCO₃/g or higher, and the clay-dispersibility is 1.4 or higher.
⑥ The calcium ion-capturability is 400 mgCaCO₃/g or higher, and the clay-dispersibility is 1.4 or higher.
⑦ The calcium ion-capturability is 450 mgCaCO₃/g or higher, and the clay-dispersibility is 1.4 or higher.
⑧ The calcium ion-capturability is 400 mgCaCO₃/g or higher, and the clay-dispersibility is 1.5 or higher.
⑨ The calcium ion-capturability is 450 mgCaCO₃/g or higher, and the clay-dispersibility is 1.5 or higher.

The gelatability of the maleic acid-based copolymer of the present invention is defined as the absorbancy measured under the following conditions.

Conditions for measuring gelatability:
Vessel: 500 cc tall beaker
Polymer: 40 ppm (calculated as a solid content) based on the test solution
Test solution: 400 g of a 400 ppm $CaCl_2$ solution
Temperature: 50° C.
pH: 8
Stationary standing period: 1 hour
Measurement method: the solution is stirred for 5 minutes using a stirrer, a portion of the solution is sampled, and its absorbancy (ABS) for 380 nm ultraviolet rays is measured using a 50 mm cell.

Generally, polymers having a high gelatability are easily unsolubilized in a washing liquid and, particularly when water having a high hardness is used, washing power greatly decreases. To maintain a high washing power of the maleic acid-based copolymer contained in the detergent composition, a lower gelatability is preferable and the gelatability is preferably 0.2 or lower.

The gelatability is a numerical value for evaluating the ease of precipitation of polymers in the presence of calcium ions, and is a degree of white turbidity as measured by an absorbancy for ultraviolet rays when polymers are heated in the presence of calcium ions. Larger numerical values of the gelatability show greater turbidity of a polymer solution and show a larger amount of polymer is precipitated in the presence of calcium ions.

The index of the gelatability is shown below. The smaller the below-mentioned numerical value is, the higher the abilities of a polymer as a detergent builder is.

0.1 or smaller: the polymer is very hard to gelate.
0.1 to 0.2, but excluding 0.1: the polymer is hard to gelate.
0.2 to 0.4, but excluding 0.2: the polymer is easy to gelate.
Larger than 0.4: the polymer is very easy to gelate.

The detergent composition of the present invention includes the maleic acid-based copolymer and the later-mentioned surfactant. In the detergent composition, the combined amount of the maleic acid-based copolymer is preferably within the range of 0.1 to 20% by weight, more preferably within the range of 0.5 to 15% by weight, and the combined amount of the surfactant is preferably within the range of 5 to 70% by weight, more preferably within the range of 20 to 60% by weight.

Not only the surfactant, but also an enzyme, if necessary, may be added into the detergent composition containing the maleic acid-based copolymer of the present invention.

As the surfactant, there can preferably be used at least one selected from the group consisting of anionic surfactants, nonionic surfactants, ampholytic surfactants and cationic surfactants.

As examples of the anionic surfactants, there can be cited alkylbenzenesulfonic acid salts, alkyl or alkenyl ether sulfuric acid salts, alkyl or alkenyl sulfuric acid salts, α-olefinsulfonic acid salts, α-sulfofatty acid or any ester salt thereof, alkanesulfonic acid salts, saturated or unsaturated fatty acid salts, alkyl or alkenyl ether carboxylic acid salts, amino acid type surfactants, N-acylamino acid type surfactants, and alkyl or alkenyl phosphoric acid esters or any salt thereof.

As examples of the nonionic surfactants, there can be cited polyoxyalkylene alkyl ethers, polyoxyalkylene alkenyl ethers, polyoxyethylene alkyl phenyl ethers, higher fatty acid alkanolamide or any alkylene oxide adduct thereof, sucrose fatty acid esters, alkylglycoxides, fatty acid glycerol monoesters, and alkylamine oxides.

As examples of the ampholytic surfactants, there can be cited carboxy type or sulfobetaine type ampholytic surfactants, and examples of the cationic surfactants, there can be cited quaternary ammonium salts.

Protease, lipase, cellulase and the like can be used as the enzymes which may be added into the detergent composition containing the maleic acid-based copolymer of the present invention. Particularly preferred are protease, alkaline lipase, and alkaline cellulase, all of which are highly active in alkaline washing liquids. The combined amount of the enzymes is preferably within the range of 0.01 to 5% by weight. If the combined amount deviates from this range, the balance with the surfactants is lost and the washing power cannot be enhanced.

Into the detergent composition containing the maleic acid-based copolymer of the present invention, there may, if necessary, be added conventional components such as alkaline builders, chelate builders, re-attachment inhibitors, fluorescent agents, bleachers and perfumes, all of which are usually used for detergent compositions. In addition, zeolite may also be added. As the alkaline builders, there can be used silicic acid salts, carbonic acid salts, sulfuric acid salts and the like. As the chelate builders, there can be used diglycolic acid, oxycarboxylic acid salts, EDTA (ethylenediaminetetraacetic acid), DTPA (diethylenetriaminehexaacetic acid), citric acid and the like, if necessary.

The detergent composition containing the maleic acid-based copolymer of the present invention is preferably used as a detergent for clothes. Particularly, this composition having a defined calcium ion-capturability and a low gelatability is very effective for inhibiting the yellowing due to a slight amount of metal, such as iron ions and zinc ions, existing in washing liquids.

The detergent composition containing the maleic acid-based copolymer of the present invention is well balanced between ① an effect upon the dispersion of mud dirt and ② an effect upon the removal of oil dirt by inhibiting the unsolubilization of the surfactant by capturing calcium ions in the detergent composition. Thus, the composition of the present invention is a detergent composition which displays high performance.

(Calcium ion-stabilization degree constant and level of adsorption to clay):

The weight-average molecular weight of the maleic acid-based copolymer of the present invention is preferably within the range of 1,000 to 100,000. In view of improving the calcium ion-stabilization degree constant and the ability to be adsorbed to clay, the weight-average molecular weight is more preferably within the range of 2,000 to 50,000, still more preferably 3,000 to 30,000, and most preferably 5,000 to 15,000.

The calcium ion-stabilization degree constant of the maleic acid-based copolymer of the present invention shows a degree to which the copolymer chelates calcium ions in water. Higher calcium ion-stabilization degree constants of the copolymer show that the copolymer more strongly chelates calcium ions, more strongly removes calcium ions existing in mud, and has a higher ability to detach mud dirt from fibers. Since calcium ions (cations) existing in clay particles bond with negatively electrically charged fibers by static electrical interactions, the calcium ions make it difficult to detach mud dirt from fibers. However, the maleic acid-based copolymer removes such calcium ions and thereby detaches mud dirt from fibers.

The calcium ion-stabilization degree constant of the maleic acid-based copolymer of the present invention is defined as the numerical value (Log K) obtained by substituting in the formula 1 a numerical value obtained under the following measurement conditions.

(1) Calcium ion solutions having concentrations of 0.002 mol/L, 0.003 mol/L and 0.004 mol/L respectively are prepared (using $CaCl_2$) and 50 g of each solution is charged into a 100 cc beaker;

(2) 50 mg (calculated as a solid content) of a maleic acid-based copolymer is added;

(3) the pH is adjusted to 10;

(4) 0.15 g of NaCl is added as a stabilizer for a calcium ion electrode; and (5) the concentration of free calcium ions is measured using the calcium ion electrode.

When the concentration of free calcium ions is denoted by [Ca], the concentration of fixed calcium ions by [CaS], free chelate sites by [S], the number of chelate sites by [S0], and the stabilization degree constant by Log K; then [Ca][S]/[CaS]=1/K and [S]=[S0]−[CaS]. Accordingly, [Ca]/[CaS]= 1/[S0].[Ca]+1/[S0].K. [Ca]/[CaS] is plotted on the vertical axis and [Ca] is plotted on the horizontal axis to determine [S0], K and Log K from the slope and intercept.

The calcium ion-stabilization degree constant of the maleic acid-based copolymer of the present invention is 4.0 or larger and preferably within the range of 4.2 to 6.0 in view of washability with respect to mud dirt. The most preferable constant to further enhance washability is within the range of 4.5 to 5.5. In the case where not only the maleic acid-based copolymer but also the enzymes are added into a detergent composition, if the calcium ion-stabilization degree constant of the copolymer is too large, metal ions contained in the enzymes may be eliminated, whereby the washing power of the enzymes may be weakened.

The level in which the maleic acid-based copolymer of the present invention is adsorbed to clay particles is defined as the numerical value calculated from a value measured by the below-mentioned measurement method.

Conditions for measuring the level of adsorption to clay particles:

Vessel: 100 cc measuring cylinder

Polymer solution: 1 cc of a 0.5% (calculated as a solid content) aqueous polymer solution+100 g of supply water of Himeji-city, Japan Clay: 1.0 g of Amazon clay Stirring period: 10 minutes (using a magnetic stirrer)

Stationary standing period: 18 hours

Measurement method: 10 cc of an uppermost portion of the solution in the measuring cylinder is sampled, the supernatant is filtrated, and the level of adsorption is measured using the forementioned gel permeation chromatography.

The above-mentioned measurement is repeated under the above-mentioned measurement conditions except that no clay was used, whereby the level of adsorption to clay particles is calculated according to the following formula.

Level of adsorption to clay particles=(polymer peak area in the case where clay was added)/(polymer peak area in a clay-free system)×100 (%)

The level of adsorption to clay particles shows a degree of an ability to be adsorbed to clay particles. The maleic acid-based copolymer adsorbs mud dirt during washing, whereby clay particles are negatively electrically charged. Since fibers have negative electric charge, mud is eliminated from the fibers by the static electrical repulsion, whereby clay is detached from the fibers. However, if the copolymer excessively adsorbs mud dirt, re-attachment of mud dirt occurs, whereby the washing power is weakened. Accordingly, as shown below, the copolymer displaying a level of adsorption to clay within the optimal range is optimal for washing mud dirt.

When the level is within the range of 40 to 60%, it is very optimal.

When the level is within the range of 30 to 70%, it is optimal.

When the level is within the range of 20 to 90%, it is suitable.

When the level is within the range of 90 to 95% or within the range of 10 to 20%, but excluding 90% and 20%, it is unsuitable.

When the level is higher than 95% or lower than 10%, it is very unsuitable.

The gelatability of the maleic acid-based copolymer of the present invention is also defined as the absorbancy measured under the aforementioned measurement conditions.

Generally, polymers having a high gelatability are easily unsolubilized in a washing liquid and, particularly when water having a high hardness is used, washing power greatly decreases. To maintain a high washing power of the maleic acid-based copolymer contained in the detergent composition, a lower gelatability is preferable and the gelatability is preferably 0.2 or lower.

The gelatability is a numerical value for evaluating the ease of precipitation of polymers in the presence of calcium ions, and is a degree of white turbidity as measured by an absorbancy for ultraviolet rays when polymers are heated in the presence of calcium ions. Larger numerical values of the gelatability show greater turbidity of a polymer solution and show a larger amount of polymer is precipitated in the presence of calcium ions.

The index of the gelatability is shown below. The smaller the below-mentioned numerical value is, the higher the abilities of a polymer as a detergent builder are.

0.1 or smaller: the polymer is very hard to gelate.

0.1 to 0.2, but excluding 0.1: the polymer is hard to gelate.

0.2 to 0.4, but excluding 0.2: the polymer is easy to gelate.

Larger than 0.4: the polymer is very easy to gelate.

The detergent composition of the present invention includes the maleic acid-based copolymer and the aforementioned surfactant. In the detergent composition, the combined amount of the maleic acid-based copolymer is preferably within the range of 0.1 to 20% by weight, more preferably within the range of 0.5 to 15% by weight, and the combined amount of the surfactant is preferably within the range of 5 to 70% by weight, more preferably within the range of 20 to 60% by weight.

Not only the surfactant, but also the aforementioned enzyme, if necessary, may be added into the detergent composition containing the maleic acid-based copolymer of the present invention.

Into the detergent composition containing the maleic acid-based copolymer of the present invention, there may, if necessary, be added conventional components such as alkaline builders, chelate builders, re-attachment inhibitors, fluorescent agents, bleachers and perfumes; all of which are usually used for detergent compositions. In addition, zeolite may also be added. As the alkaline builders, there can be used silicic acid salts, carbonic acid salts, sulfuric acid salts and the like. As the chelate builders, there can be used diglycolic acid, oxycarboxylic acid salts, EDTA (ethylenediaminetetraacetic acid), DTPA (diethylenetriaminehexaacetic acid), citric acid and the like, if necessary.

Since the detergent composition containing the maleic acid-based copolymer of the present invention has a defined calcium ion-stabilization degree constant and a defined level of adsorption to clay, this composition can break bonds between mud dirt and fibers, detach the mud dirt from the fibers, and inhibit re-attachment of the mud dirt to the fibers.

(Production process of maleic acid-based copolymer):

The process of the present invention for producing a maleic acid-based copolymer includes the steps of:

charging a material (A) into a reaction vessel, in such a manner that the concentration of the material (A) will be 35% by weight or higher, wherein the material (A) is maleic acid and/or its salt;

adding hydrogen peroxide into the reaction vessel after the above-mentioned charging step, in such a manner that the amount of hydrogen peroxide is within the range of 3 to 20% by weight of the material (A); and adding a water-soluble ethylenically unsaturated monomer (B) into the reaction vessel after the above-mentioned charging step and within 30 to 500 minutes after initiation of a reaction, in such a manner that the ratio (A)/(B) is within the range of 95/5 to 5/95 in mol ratio, wherein the adding of the monomer (B) is completed 10 to 300 minutes later than completion of the above-mentioned step of adding hydrogen peroxide.

Maleic acid (salt) used for producing a maleic acid-based copolymer may be any type selected from maleic acid, monoalkali metal maleate and dialkali metal maleate, and also may be any mixture of at least two of them. In addition, maleic acid may be that obtained by hydrolyzing maleic anhydride in the reaction vessel. The monoalkali metal maleate and the dialkali metal maleate may be those obtained by reacting maleic acid and/or maleic anhydride with an alkali metal, an alkali metal hydroxide or the like in the reaction vessel.

The concentration of the maleic acid (salt) at initiation of polymerization is preferably 35% by weight or higher in order to improve polymerizability and to thereby improve the calcium ion-capturability and calcium ion-stabilization degree constant of the maleic acid-based copolymer. In addition, the concentration of the maleic acid (salt) at initiation of polymerization is more preferably 45% by weight or higher, and still more preferably 60% by weight or higher.

The used mol ratio of the maleic acid (salt) to the water-soluble ethylenically unsaturated monomer (maleic acid (salt)/water-soluble ethylenically unsaturated monomer) is preferably within the range of 95/5 to 5/95, more preferably 90/10 to 20/80 and most preferably 70/30 to 40/60 in order to improve the calcium ion-capturability and clay-dispersibility of the maleic acid-based copolymer obtainable by the production process of the present invention, and to thereby optimize the calcium ion-stabilization degree constant and level of adsorption to clay of the copolymer. If the used ratio deviates from the range of 95/5 to 5/95, the resulting maleic acid-based copolymer may be inferior with respect to the calcium ion-capturability and clay-dispersibility, and the calcium ion-stabilization degree constant and level of adsorption to clay of the copolymer may decrease.

It is preferable that 70% by weight or more of the total used amount of the maleic acid (salt) is charged into the reaction vessel before the reaction. The more preferable ratio of a portion of the maleic acid (salt), charged into the reaction vessel before initiation of the reaction, to the total used amount of the maleic acid (salt) is 90% by weight or larger, most preferably 100% by weight, in order to lower the amount of the maleic acid (salt) remaining after completion of polymerization, to improve the calcium ion-capturability of the resulting polymer, and to set its calcium ion-stabilization degree constant within the preferable range. If a portion smaller than 70% by weight of the total used amount of the maleic acid (salt) is charged into the reaction vessel before initiation of the reaction, the amount of the residual maleic acid (salt) may increase after polymerization.

The water-soluble ethylenically unsaturated monomer is not especially limited so long as it is an ethylenically unsaturated monomer having water-solubility, and the previously exemplified ones are preferable. It is more preferable that the solubility of the water-soluble ethylenically unsaturated monomer is 5 g or higher per 100 g of 100° C. water.

It is preferable that 70% by weight or more of the total used amount of the water-soluble ethylenically unsaturated monomer is added into the reaction vessel after charging the maleic acid (salt) and within 30 to 500 minutes after initiation of the reaction. The balance, smaller than 30% by weight, may be added into the reaction vessel before polymerization. In addition, it is preferable that no water-soluble ethylenically unsaturated monomer is added into the reaction vessel before polymerization, and that the total used amount of the water-soluble ethylenically unsaturated monomer is added into the reaction vessel within 30 to 500 minutes after initiation of the reaction. If 30% by weight or more of the total used amount of the water-soluble ethylenically unsaturated monomer is added into the reaction vessel before polymerization, the resulting maleic acid-based copolymer has a broad molecular weight distribution and is also a block polymer and heterogeneous polymer. Because of this, the clay-dispersibility may decrease and therefore the level of adsorption to clay particles may decrease.

When the maleic acid-based copolymer is produced, hydrogen peroxide is used as a water-soluble polymerization initiator. Hydrogen peroxide is added into the reaction vessel after charging the maleic acid (salt). The used amount of hydrogen peroxide is preferably within the range of 3 to 20% by weight of the maleic acid (salt) (A). It is unpreferable that the used amount of hydrogen peroxide is smaller than 3% by weight, because the amount of residual maleic acid increases, because the molecular weight of the resulting polymer becomes too high, and because the clay-dispersibility and the level of adsorption to clay particles decrease. In view of improving the clay-dispersibility and optimizing the level of adsorption to clay particles, it is more preferable that the used amount of hydrogen peroxide is larger than 5% by weight. On the other hand, if the used amount of hydrogen peroxide is larger than 20% by weight, the amount of residual hydrogen peroxide will be too large at the completion of polymerization.

In view of: simplifying production facilities; reducing costs; and diminishing the amount of residual hydrogen peroxide at the completion of polymerization; it is preferable that the addition of hydrogen peroxide is completed 10 to 300 minutes earlier than the addition of the water-soluble ethylenically unsaturated monomer is completed, and that the addition of the water-soluble ethylenically unsaturated monomer is completed 10 to 300 minutes later than the addition of hydrogen peroxide is completed.

To further diminish the amount of residual hydrogen peroxide in the reaction liquid, the following method ① or ② of adding hydrogen peroxide may, for example, be carried out.

① The rate at which hydrogen peroxide is added is decreased gradually with time. For example, the rate is decreased linearly in such a manner that the rate just before completion of the addition is 0.5 times or less, preferably 0.1 time or less, of the rate in the initial stage of the addition.

② In the initial stage of the polymerization (in the initial period of two-thirds the entire polymerization time), 70 to 99% of the entire amount of hydrogen peroxide is added; and in the post-stage of the polymerization (in the residual one-third-period), the residual hydrogen peroxide is added.

The above-mentioned production conditions can reduce the concentration of hydrogen peroxide, which remains after completion of the polymerization, to 2% by weight or lower, more preferably 1% by weight or lower, still more preferably 0.5% by weight or lower, of the entire amount of the reaction liquid. In addition, the production conditions can reduce the amount of maleic acid, which remains after completion of the polymerization, to 3% by weight or smaller, more preferably 1% by weight or smaller, of the entire amount of the reaction liquid. If the amount of residual maleic acid is larger than 3% by weight, there is a possibility that a problem may occur that crystals of maleic acid are deposited in places where it is cold in winter.

It is preferable to add the water-soluble ethylenically unsaturated monomer in a short time, because this provides the obtained maleic acid-based copolymer with the following good properties: the molecular weight distribution is narrow; the clay-dispersibility is improved; the level of adsorption to clay particles is optimized; and the gelatability is low. To add the water-soluble ethylenically unsaturated monomer in a short time is also preferable for enhancing the productivity. It is more preferable that the period over which the water-soluble ethylenically unsaturated monomer is added is 30 to 180 minutes. This provides good results whereby the resulting maleic acid-based copolymer has an improved clay-dispersibility and an optimized level of adsorption to clay particles. However, if the period is shorter than 30 minutes, the amount of maleic acid, which remains after completion of the polymerization, may increase, or heat removal may be difficult because a large amount of reaction heat may be generated in a short time.

In addition, it is preferable that the period over which hydrogen peroxide is added is 20 to 170 minutes. This also provides good results whereby the resulting maleic acid-based copolymer has an improved clay-dispersibility and an optimized level of adsorption to clay particles.

As examples of the water-soluble polymerization initiators further used in the production process of the present invention, there can be cited persulfuric acid salts such as ammonium persulfate, sodium persulfate and potassium persulfate; 2,2'-azobis(2-amidinopropane) hydrochloride; azo compounds such as 4,4'-azobis-4-cyanovaleric acid, azobisisobutyronitrile and 2,2'-azobis(4-methoxy-2, 4-dimethylvaleronitrile); organic peroxides such as benzoyl peroxide, lauroyl peroxide, peracetic acid, persuccinic acid, di-tertiary-butyl peroxide, di-tertiary-butyl hydroperoxide and cumene hydroperoxide. There may also be used any mixture of at least two selected from the group consisting of these compounds. Particularly preferred are the persulfuric acid salts such as ammonium persulfate, sodium persulfate and potassium persulfate. These provides good results whereby the resulting maleic acid-based copolymer has an improved calcium ion-capturability, an optimized calcium ion-stabilization degree constant and an improved level of adsorption to clay particles. In addition, the above-mentioned water-soluble polymerization initiators are added into the reaction vessel after the maleic acid (salt) is charged into the reaction vessel.

The pH value during the polymerization reaction can be selected optionally. The pH may be adjusted during the polymerization. As examples of basic compounds for neutralization used for adjusting the pH during the polymerization, there can be cited hydroxides and carbonates of alkali metals such as sodium, potassium and lithium; ammonia; alkylamines such as monomethylamine, diethylamine, trimethylamine, monoethylamine, dimethylamine and triethylamine; alkanolamines such as monoethanolamine, diethanolamine, triethanolamine, isopropanolamine and secondary-butanolamine; and pyridine. There may also be used any mixture of at least two selected from the group consisting of these compounds. It is preferable to carry out the polymerization in such a manner that the pH is 2 or less at initiation of the polymerization, that the pH is elevated with progress of the polymerization, and that the neutralization degree is maintained at less than 20% during the polymerization. The polymerization like this is particularly effective for improving the clay-dispersibility and for optimizing the level of adsorption to clay particles. If the neutralization degree is 20% or more during the polymerization, a problem occurs, in that the molecular weight distribution of the resulting copolymer becomes broad.

In addition, polymerization in the presence of polyvalent metal ions is preferable, because such polymerization can 1) reduce the amount of maleic acid which remains in the reaction liquid after completion of the polymerization; 2) narrow the molecular weight distribution of the resulting maleic acid-based copolymer; and 3) improve the clay-dispersibility of the copolymer. As usable effective polyvalent metal ions, there can be cited iron ions, vanadium atom-containing ions, and copper ions. Of the polyvalent metal ions, preferred are $Fe^{3+}$, $Fe^{2+}$, $Cu^+$, $Cu^{2+}$, $V^{2+}$, $V^{3+}$ and $VO^{2+}$, and more preferred are $Fe^{3+}$, $Cu^{2+}$ and $VO^{2+}$. These polyvalent metal ions may be used in combinations with each other.

The concentration of the polyvalent metal ions is preferably 0.1 to 100 ppm of the entire amount of the reaction liquid. If the concentration is lower than 0.1 ppm, few effects are obtained. If the concentration is higher than 100 ppm, the resulting maleic acid-based copolymer is highly colored and it may be impossible to use the copolymer as a component of a detergent composition.

The form in which the polyvalent metal ions are supplied is not especially limited, and any metal compound and any metal can be used so long as it becomes ionized in a polymerization reaction system. As examples of such metal compounds and metals, there can be cited water-soluble metal salts such as vanadium oxytrichloride, vanadium trichloride, vanadium oxalate, vanadium sulfate, vanadic anhydride, ammonium metavanadate, ammonium hypovanadious $[(NH_4)_2SO_4 \cdot VSO_4 \cdot 6H_2O]$, ammonium vanadious $[(NH_4)V(SO_4)_2 \cdot 12H_2O]$, copper(II) acetate, copper(II) bromide, copper(II) acetylacetate, cupric chloride, ammonium cuprous chloride, copper carbonate, copper(II) chloride, copper(II) citrate, copper(II) formate, copper(II) hydroxide, copper nitrate, copper naphthenate, copper(II) oleate, copper maleate, copper phosphate, copper(II) sulfate, cuprous chloride, copper(I) cyanide, copper iodide, copper (I) oxide, copper thiocyanate, iron acetylacetonate, ammonium iron citrate, ammonium ferric oxalate, ammonium ferrous sulfate, ammonium ferric sulfate, iron citrate, iron fumarate, iron maleate, ferrous lactate, ferric nitrate, iron pentacarbonyl, ferric phosphate and ferric pyrophosphate; metal oxides such as vanadium pentaoxide, copper(II) oxide, ferrous oxide and ferric oxide; metal sulfides such as copper (II) sulfide and iron sulfide; and copper powder and iron powder.

The above-mentioned metal compounds and metals may be charged into the reaction vessel at any time before completion of the reaction, and is preferably charged there before initiation of the reaction.

(Use of maleic acid-based copolymer):

It is preferable that the detergent composition containing the previously particularly mentioned maleic acid-based copolymer contains a maleic acid-based copolymer being obtainable by the aforementioned production process.

The inorganic pigment-dispersing agent of the present invention includes a maleic acid-based copolymer being obtainable by the production process of the present invention, and displays good performance as a dispersing agent for inorganic pigments such as heavy or light calcium carbonate and clay which are used for paper coating. The inorganic pigment-dispersing agent of the present invention may include only the maleic acid-based copolymer of the present invention, or may further include other components such as polymerized phosphoric acid and any salt thereof, phosphonic acid and any salt thereof, and polyvinyl alcohol. If a small amount of the inorganic pigment-dispersing agent of the present invention is added to an inorganic pigment instead of conventional inorganic pigment-dispersing agents and dispersed into water; then highly concentrated inorganic pigment slurries, such as highly concentrated calcium carbonate, can be produced which have a low viscosity, a high fluidity, and a good stability of these properties over a period of time. The used amount of the inorganic pigment-dispersing agent of the present invention is preferably within the range of 0.05 to 2.0 parts by weight per 100 parts by weight of the inorganic pigments.

The water-treating agent of the present invention includes a maleic acid-based copolymer being obtainable by the production process of the present invention, and is useful for inhibiting formation of scale in systems such as cooling water-circulating systems, boiler water-circulating systems, seawater desalination plants, pulp digesters and black liquor evaporators. The maleic acid-based copolymer may be used alone as the water-treating agent, or may be combined with polymerized phosphoric acid salts, phosphonic acid salts, anticorrosive agents, slime controlling agents, chelating agents, and the like, to use the resulting composition as the water-treating agent.

The fiber-treating agent of the present invention includes the maleic acid-based copolymer of the present invention and at least one selected from the group consisting of dyeing agents, peroxides and surfactants, and can be used in fiber-treating processes such as scouring, dyeing, bleaching and soaping. As the dyeing agents, peroxides and surfactants, there can be cited those which are conventionally used for fiber-treating agents. The ratio of (i) the maleic acid-based copolymer to (ii) at least one selected from the group consisting of dyeing agents, peroxides and surfactants is, for example, in order to improve the degree of whiteness, color evenness and degree of dyed colorfastness of fibers, as follows: 0.1 to 100 parts by weight of the (ii) per 1 part by weight of the (i). The fibers for which the fiber-treating agent of the present invention can be used are not especially limited. However, their examples are cellulose fibers such as cotton and hemp; chemical fibers such as nylon and polyester; animal fibers such as wool and silk; semisynthetic fibers such as rayon; and any fabric and blend thereof.

In the case where the fiber-treating agent of the present invention is used in the scouring process, it is preferable that the maleic acid-based copolymer of the present invention is combined with alkali agents and surfactants. In the bleaching process, it is preferable that the maleic acid-based copolymer of the present invention is combined with peroxides and with silicic acid-based chemicals such as sodium silicate as decomposition inhibitors for alkaline bleachers.

The maleic acid-based copolymer of the present invention has the following abilities (which are important for strengthening the washing power of detergent compositions): the calcium-ion capturability and the clay-dispersibility are superior, the gelatability is low, and these abilities are well balanced. Accordingly, this copolymer can display, as a constituent of detergent compositions, the well balanced and superior abilities to both mud dirt and oil dirt.

The maleic acid-based copolymer of the present invention further has the following abilities (which are important for strengthen the washing power of detergent compositions): the calcium-ion stabilization degree constant and the level of adsorption to clay are optimal and the gelatability is low. Accordingly, this copolymer can display, as a constituent of detergent compositions, the superior abilities to mud dirt.

In the production process of the present invention, if the ratio of the maleic acid (salt) is large when charged for polymerization, or if the concentration of the maleic acid (salt) is high at the initiation of the reaction, the conversion of the maleic acid (salt) becomes high in the initial stage of polymerization, and the calcium-ion capturability and the calcium-ion stabilization degree constant also become high. In addition, if sodium persulfate is further used as the water-soluble polymerization initiator, the calcium-ion capturability and the calcium-ion stabilization degree constant also become high, because the copolymerizability of the maleic acid increases.

In addition, if the water-soluble ethylenically unsaturated monomer is added in such a short time that the reaction does not uncontrollably progress; then, with respect to the resulting maleic acid-based copolymer, the molecular weight distribution is narrowed, the clay-dispersibility is enhanced, the level of adsorption to clay is optimized, and the gelatability is lowered.

Furthermore, if the adding of hydrogen peroxide is completed earlier than the adding of the water-soluble ethylenically unsaturated monomer, the amount of hydrogen peroxide remaining in the reaction liquid at completion of the polymerization can be reduced to the least, a polymer having a narrow molecular weight distribution can be obtained and its gelatability decreases. The reason for this is considered as follows: maleic acid is uniformly introduced into high molecular weight portions of the polymer, and the amount of low molecular weight polymerized products can be reduced, whereby the polymer having a narrow molecular weight distribution is formed. If the water-soluble ethylenically unsaturated monomer is added in such a short time that the reaction does not uncontrollably progress, the efficiency of the entire polymerization reaction can be raised. In addition, if the polyvalent metal ions are present in the polymerization reaction system, the amount of residual maleic acid in the reaction liquid at completion of the polymerization is sufficiently reduced, the reaction efficiency becomes high, and the molecular weight distribution of the resulting maleic acid-based copolymer can be narrowed.

The maleic acid-based copolymer of the present invention has the aforementioned superior abilities and only contains a small amount of residual initiators and a small amount of residual monomers. Accordingly, this copolymer is preferably used for detergent compositions, inorganic pigment-dispersing agents, water-treating agents and fiber-treating agents.

BEST MODE FOR CARRYING OUT THE INVENTION

Hereinafter, this invention is illustrated by the following examples of some preferred embodiments. However, this invention is not limited to the undermentioned examples. The units "%" and "part(s)" denote "% by weight" and "part(s) by weight" respectively. In addition, the word "monomer(s)" denotes "maleic acid (salt(s))".

EXAMPLE 1-1

Into a four-necked flask having a capacity of 1 liter and equipped with a thermometer, stirrer and reflux condenser were charged 196 parts of maleic anhydride (232 parts as maleic acid), 110.7 parts of deionized water and 333.3 parts of a 48% aqueous sodium hydroxide solution. (A solid content of the resulting aqueous solution was 50% in the initial stage of polymerization.) Then, while stirring, the aqueous solution was heated to its boiling temperature under normal pressure. Next, under stirring conditions, 75.5 parts (8.26% by weight based on maleic acid (salt) (A)) of a 35% aqueous hydrogen peroxide solution and 102.86 parts of a 60% aqueous acrylic acid solution (maleic acid/acrylic acid= 7/3 mol ratio) were added dropwise continuously over a 120-minute period and over a 150-minute period respectively to complete a polymerization reaction (the monomer concentration was 50% at initiation of the polymerization).

The weight-average molecular weight of the resulting maleic acid-based copolymer (1-1) and the amount of residual maleic acid were measured using gel permeation chromatography. Their results are shown in Table 3. Herein, ASAHI Pack GFA-7MF, made by ASAHI KASEI Co., was used as the column, and a 0.5% aqueous phosphoric acid solution was used as the eluent.

A sodium polyacrylate standard sample, made by SOWA KAGAKU Co., was used as the standard sample for measuring the molecular weight.

The polymer was added under the below-mentioned conditions into an aqueous calcium carbonate solution which had been prepared under the below-mentioned conditions. The resulting solution was stirred. Before and after this stirring, the calcium ion concentration in the aqueous calcium carbonate solution was measured by a calcium electrode (93-20), made by OLION Co., using an ion analyzer (EA920), made by OLION Co., to determine the amount of calcium ions, which were captured by the polymer, from the difference of the calcium ion concentrations before and after the stirring, wherein the amount of calcium ions was calculated as calcium carbonate in milligrams. The numerical value obtained was taken as the calcium ion-capturability of the polymer.

Conditions for measuring calcium ion-capturability:
- Vessel: 100 cc beaker
- Solution: 50 cc of a $1.0 \times 10^{-3}$ mol/l $Ca^{2+}$ aqueous solution
- Polymer: 10 mg (calculated as a solid content)
- Temperature: 25° C.
- Stirring period: 10 minutes (using a stirrer)

Clay was added into a polymer solution which had been prepared under the below-mentioned conditions. The resulting solution was stirred and then allowed to stand stationary. Then, the absorbancy of the solution was measured and its resulting numerical value was taken as the clay-dispersibility of the polymer. Larger numerical values mean higher clay-dispersibility.

Conditions for measuring clay-dispersibility:
- Vessel: 100 cc measuring cylinder
- Polymer solution: 1 cc of a 0.5% (calculated as a solid content) aqueous polymer solution+100 g of supply water of Himeji-city, Japan
- Clay: 1.0 g of Amazon clay
- Stirring period: 10 minutes (using a magnetic stirrer)
- Stationary standing period: 18 hours
- Measurement method: 10 cc of an uppermost portion of the solution in the measuring cylinder was sampled, its absorbancy (ABS) for 380 nm ultraviolet rays was measured using a 1 cm cell, and the obtained numerical value was taken as the clay-dispersibility.

The polymer was added into and gelated in a $CaCl_2$ test solution which had been prepared under the below-mentioned conditions. Then, the absorbancy of the resulting solution was measured and the obtained numerical value was taken as the gelatability of the polymer. Larger numerical values mean higher gelatability.

Conditions for measuring gelatability:
- Vessel: 500 cc tall beaker
- Polymer: 40 ppm (calculated as a solid content) based on the test solution
- Test solution: 400 g of a 400 ppm $CaCl_2$ solution
- Temperature: 50° C.
- pH: 8
- Stationary standing period: 1 hour
- Measurement method: the solution was stirred for 5 minutes using a stirrer, a portion of the solution was sampled, and its absorbancy (ABS) for 380 nm ultraviolet rays was measured using a 50 mm cell.

EXAMPLE 1-2

The polymerization of Example 1-1 was repeated except that the 35% aqueous hydrogen peroxide solution was added dropwise over a 150-minute period at a rate which was decreased gradually and linearly from 1.5 to 0.1 cc/min. Then the same analyses as of Example 1-1 were carried out. Results are shown in Table 3 (the monomer concentration was 50% at initiation of the polymerization).

EXAMPLE 1-3

The polymerization of Example 1-1 was repeated except that the 35% aqueous hydrogen peroxide solution was added dropwise over a 150-minute period wherein 65.0 parts of the solution was added continuously over an initial 60-minute period and then 10.5 parts of the solution was added continuously over a 90-minute period. Then the same analyses as of Example 1-1 were carried out. Results are shown in Table 3 (the monomer concentration was 50% at initiation of the polymerization).

EXAMPLE 1-4

The polymerization of Example 1-1 was repeated except that 38.1 parts (2 g per 1 mol of the charged monomers) of a 15% aqueous sodium persulfate solution was added dropwise continuously over a 100-minute period after 50 minutes from initiation of the polymerization. Then the same analyses as of Example 1-1 were carried out. Results are shown in Table 3 (the monomer concentration was 50% at initiation of the polymerization).

EXAMPLES 1-5 TO 1-11

The polymerization of Example 1-1 was repeated except that the water-soluble ethylenically unsaturated monomers (B), as described in Tables 1, 2 and 4, were used in the amount, as described in the same Tables, instead of the 60% aqueous acrylic acid solution. Then the same analyses as of Example 1-1 were carried out. Results are shown in Tables 3 and 6 (the monomer concentration was 50% at initiation of the polymerization).

EXAMPLES 1-12 TO 1-14

The polymerization of Example 1-1 was repeated except that the 60% aqueous acrylic acid solution was used as the water-soluble ethylenically unsaturated monomer (B) in such an amount as described in Table 4, and that 38.1 parts of a 15% aqueous sodium persulfate solution was added dropwise continuously over a 100-minute period after 50 minutes from initiation of the polymerization. Then the same analyses as of Example 1-1 were carried out. Results are shown in Table 6 (the monomer concentration was 50% at initiation of the polymerization).

EXAMPLE 1-15

The polymerization of Example 1-1 was repeated except that the amount of the 48% aqueous sodium hydroxide solution was changed to 50 parts, and that 0.04 parts of ammonium ferrous sulfate hexahydrate was further charged into the flask. Then the same analyses as of Example 1-1 were carried out. Results are shown in Table 6 (the monomer concentration was 68.7% at initiation of the polymerization).

EXAMPLES 1-16 TO 1-19

The polymerization of Example 1-15 was repeated except that the amount of the 60% aqueous acrylic acid solution and the amount used of hydrogen peroxide were those described in Tables 4 and 5. Then the same analyses as of Example 1-1 were carried out. Results are shown in Table 6 (the monomer concentration was 68.7% at initiation of the polymerization).

EXAMPLES 1-20

The polymerization of Example 1-1 was repeated except: that 45.7 parts (5.0% by weight based on maleic acid (salt) (A)) of the 35% aqueous hydrogen peroxide solution was added dropwise continuously over a 60-minute period from initiation of the polymerization; that 26.7 parts (1 g per 1 mol of the charged monomers) of a 15% aqueous sodium persulfate solution was added dropwise continuously over a 90-minute period after 60 minutes from initiation of the polymerization; and that 180.3 parts of an 80% aqueous acrylic acid solution (maleic acid/acrylic acid=5/5 mol ratio) was added dropwise continuously over a 150-minute period instead of 102.86 parts of the 60% aqueous acrylic acid solution. Then the same analyses as of Example 1-1 were carried out. Results are shown in Table 6 (the monomer concentration was 50% at initiation of the polymerization).

EXAMPLES 1-21

The polymerization of Example 1-20 was repeated except: that the 35% aqueous hydrogen peroxide solution was added over an 80-minute period from initiation of the polymerization; and that the 15% aqueous sodium persulfate solution was added over a 70-minute period after 80 minutes from initiation of the polymerization. Then the same analyses as of Example 1-1 were carried out. Results are shown in Table 6 (the monomer concentration was 50% at initiation of the polymerization).

EXAMPLES 1-22

The polymerization of Example 1-20 was repeated except: that the added amount of the 35% aqueous hydrogen peroxide solution was 57.1 parts (6.25% by weight based on the monomers); that the added amount of the 15% aqueous sodium persulfate solution was 33.3 parts (1.5 g per 1 mol of the charged monomers); and that the added amount of the 80% aqueous acrylic acid solution was 120 parts (maleic acid/acrylic acid=6/4 mol ratio). Then the same analyses as of Example 1-1 were carried out. Results are shown in Table 6 (the monomer concentration was 50% at initiation of the polymerization).

EXAMPLES 1-23

Low molecular weight contents were removed from the maleic acid-based copolymer (1-20), obtained in Example 1-20, using a dialyzing membrane having a differential molecular weight of 1,000 (SPECTRA-PORE 6 made by IEDA TRADING Co.), whereby a maleic acid-based copolymer (1-23) was obtained. Then the same analyses as of Example 1-1 were carried out. Results are shown in Table 6.

Treating conditions:
ion-exchanged water: 1 liter
vessel: 1 liter beaker
polymer: 50 g
treating period: 24 hours

EXAMPLES 1-24 and 1-25

The maleic acid-based copolymers (1-21) and (1-22), obtained in Examples 1-21 and 1-22, were treated in the same way as of Example 1-23, whereby maleic acid-based copolymers (1-24) and (1-25) were obtained. Then the same analyses as of Example 1-1 were carried out. Results are shown in Table 6.

TABLE 1

| Example | Maleic acid-based copolymer | (B) (parts) | (A)/(B) (mole ratio) | 48% NaOH charged initially (parts) (neutralization degree %) | 35% aq. $H_2O_2$ (wt % based on (A)) | Others: initiator | Monomer concentration at initiation of polymerization (%) | Dropping period of (B) (minutes) | Dropping period of aq. $H_2O_2$ (minutes) | Note |
|---|---|---|---|---|---|---|---|---|---|---|
| 1-1 | (1-1) | *1 (102.86 parts) | 70/30 | 333.3 parts (100%) | 75.5 parts (8.26%) | — | 50% | 150 minutes | 120 minutes | — |
| 1-2 | (1-2) | *1 (102.86 parts) | 70/30 | 333.3 parts (100%) | 75.5 parts (8.26%) | — | 50% | 150 minutes | 150 minutes | *2 |
| 1-3 | (1-3) | *1 (102.86 parts) | 70/30 | 333.3 parts (100%) | 75.5 parts (8.26%) | — | 50% | 150 minutes | 150 minutes | *3 |
| 1-4 | (1-4) | *1 (102.86 parts) | 70/30 | 333.3 parts (100%) | 75.5 parts (8.26%) | 15% NAPS 38.1 parts | 50% | 150 minutes | 120 minutes | *4 |
| 1-5 | (1-5) | *1 (122.7 parts) | 70/30 | 333.3 parts (100%) | 75.5 parts (8.26%) | — | 50% | 150 minutes | 120 minutes | — |

(Footnote)
(A): Maleic acid (salt)
(B): Water-soluble ethylenically unsaturated monomer
aq. $H_2O_2$: aqueous hydrogen peroxide solution
15% NAPS: 15% aqueous sodium persulfate solution
*1 60% aqueous acrylic acid solution
*2 The dropping rate of the aq. $H_2O_2$ was decreased gradually and linearly from 1.5 to 0.1 cc/min.
*3 Sixty parts of the aq. $H_2O_2$ was added dropwise over an initiation 60-minute period.
*4 The 15% NAPS was added dropwise over a 100-minute period after 50 minutes from initiation of polymerization.

TABLE 2

| Example | Maleic acid-based copolymer | (B) (parts) | (A)/(B) (mole ratio) | 48% NaOH charged initially (parts) (neutralization degree %) | 35% aq. $H_2O_2$ (wt % based on (A)) | Others: initiator | Monomer concentration at initiation of polymerization (%) | Dropping period of (B) (minutes) | Dropping period of aq. $H_2O_2$ (minutes) | Note |
|---|---|---|---|---|---|---|---|---|---|---|
| 1-6 | (1-6) | *1 (286.3 parts) | 50/50 | 333.3 parts (100%) | 75.5 parts (8.26%) | — | 50% | 150 minutes | 120 minutes | — |
| 1-7 | (1-7) | *2 (922 parts) + *1 (102.86 parts) | 53.8/46.2 | 333.3 parts (100%) | 75.5 parts (8.26%) | — | 50% | 150 minutes | 120 minutes | — |
| 1-8 | (1-8) | *3 (102.86 parts) + *1 (102.86 parts) | 53.8/46.2 | 333.3 parts (100%) | 75.5 parts (8.26%) | — | 50% | 150 minutes | 120 minutes | — |
| 1-9 | (1-9) | *4 (49.6 parts) + *1 (102.86 parts) | 53.8/46.2 | 333.3 parts (100%) | 75.5 parts (8.26%) | — | 50% | 150 minutes | 120 minutes | — |
| 1-10 | (1-10) | *5 (268.2 parts) | 70/30 | 333.3 parts (100%) | 75.5 parts (8.26%) | — | 50% | 150 minutes | 120 minutes | — |

(Footnote)
(A): Maleic acid (salt)
(B): Water-soluble ethylenically unsaturated monomer
aq. $H_2O_2$: aqueous hydrogen peroxide solution
*1 60% aqueous acrylic acid solution
*2 20% aqueous sodium 2-hydroxy-3-allyloxypropanesulfonate solution
*3 5 mol EO-added isoprenol
*4 allyl alcohol
*5 30% aqueous sodium acrylate solution

TABLE 3

| Example | Maleic acid-based copolymer | Molecular weight | $Ca^{2+}$ capturability (mgCaCO$_3$/g) | Hydrogen peroxide concentration at end of polymerization (%) | Amount of residual maleic acid (%) | Clay dispersibility | Gelatability |
|---|---|---|---|---|---|---|---|
| 1-1 | (1-1) | 3,000 | 360 | 0.5 | 1.2 | 1.5 | 0.13 |
| 1-2 | (1-2) | 2,800 | 350 | 1.2 | 1.3 | 1.4 | 0.12 |
| 1-3 | (1-3) | 3,200 | 380 | 0.9 | 1.5 | 1.3 | 0.13 |
| 1-4 | (1-4) | 2,800 | 380 | 0.7 | 0.5 | 1.4 | 0.11 |
| 1-5 | (1-5) | 2,500 | 300 | 0.3 | 1.5 | 1.4 | 0.11 |
| 1-6 | (1-6) | 3,500 | 320 | 0.6 | 0.5 | 1.5 | 0.11 |
| 1-7 | (1-7) | 3,500 | 310 | 0.7 | 0.8 | 1.5 | 0.09 |
| 1-8 | (1-8) | 3,200 | 300 | 0.3 | 0.5 | 1.5 | 0.09 |
| 1-9 | (1-9) | 3,800 | 320 | 0.5 | 0.4 | 1.6 | 0.10 |
| 1-10 | (1-10) | 4,000 | 350 | 0.9 | 1.8 | 1.5 | 0.13 |

TABLE 4

| Example | Maleic acid-based copolymer | (B) (parts) | (A)/(B) (mole ratio) | 48% NaOH charged initially (parts) (neutralization degree %) | 35% aq. H$_2$O$_2$ (wt % based on monomer) | Others: initiator | Monomer concentration at initiation of polymerization (%) | Dropping period of (B) (minutes) | Dropping period of aq. H$_2$O$_2$ (minutes) | Note |
|---|---|---|---|---|---|---|---|---|---|---|
| 1-11 | (1-11) | *$^1$ (625.8 parts) | 50/50 | 333.3 parts (100%) | 75.5 parts (8.26%) | — | 50% | 150 minutes | 120 minutes | — |
| 1-12 | (1-12) | *$^2$ (160 parts) | 60/40 | 333.3 parts (100%) | 75.5 parts (8.26%) | 15% NAPS 38.1 parts | 50% | 150 minutes | 120 minutes | *$^3$ |
| 1-13 | (1-13) | *$^2$ (240 parts) | 50/50 | 333.3 parts (100%) | 75.5 parts (8.26%) | 15% NAPS 38.1 parts | 50% | 150 minutes | 120 minutes | *$^3$ |
| 1-14 | (1-14) | *$^2$ (360 parts) | 40/60 | 333.3 parts (100%) | 75.5 parts (8.26%) | 15% NAPS 38.1 parts | 50% | 150 minutes | 120 minutes | *$^3$ |
| 1-15 | (1-15) | *$^2$ (102.86 parts) | 70/30 | 50 parts (15%) | 75.5 parts (10.78%) | — | 68.7% | 150 minutes | 120 minutes | *$^4$ |
| 1-16 | (1-16) | *$^2$ (160 parts) | 60/40 | 50 parts (15%) | 75.5 parts (10.78%) | — | 68.7% | 150 minutes | 120 minutes | *$^4$ |

(Footnote)
(A): Maleic acid (salt)
(B): Water-soluble ethylenically unsaturated monomer
aq. H$_2$O$_2$: aqueous hydrogen peroxide solution
*$^1$30% sodium acrylate
*$^2$60% aqueous acrylic acid solution
*$^3$The 15% NAPS was added dropwise over a 100-minute period after 50 minutes from initiation of polymerization.
*$^4$Ammonium ferrous sulfate hexahydrate was added in an amount of 0.04 parts.

TABLE 5

| Example | Maleic acid-based copolymer | (B) (parts) | (A)/(B) (mole ratio) | 48% NaOH charged initially (parts) (neutralization degree %) | 35% aq. H$_2$O$_2$ (wt % based on monomer) | Others: initiator | Monomer concentration at initiation of polymerization (%) | Dropping period of (B) (minutes) | Dropping period of aq. H$_2$O$_2$ (minutes) | Note |
|---|---|---|---|---|---|---|---|---|---|---|
| 1-17 | (1-17) | *$^1$ (240 parts) | 50/50 | 50 parts (15%) | 75.5 parts (10.78%) | — | 68.7% | 150 minutes | 120 minutes | *$^3$ |
| 1-18 | (1-18) | *$^1$ (560 parts) | 30/70 | 50 parts (15%) | 75.5 parts (10.78%) | — | 68.7% | 150 minutes | 120 minutes | *$^3$ |
| 1-19 | (1-19) | *$^1$ (960 parts) | 20/80 | 50 parts (15%) | 75.5 parts (10.78%) | — | 68.7% | 150 minutes | 120 minutes | *$^3$ |
| 1-20 | (1-20) | *$^2$ (180.3 parts) | 50/50 | 333.3 parts (100%) | 75.5 parts (8.26%) | 15% NAPS 26.7 parts | 50% | 150 minutes | 60 minutes | *$^4$ |
| 1-21 | (1-21) | *$^2$ (180.3 parts) | 50/50 | 333.3 parts (100%) | 75.5 parts (8.26%) | 15% NAPS 26.7 parts | 50% | 150 minutes | 80 minutes | *$^5$ |

TABLE 5-continued

| Example | Maleic acid-based copolymer | (B) (parts) | (A)/(B) (mole ratio) | 48% NaOH charged initially (parts) (neutralization degree %) | 35% aq. $H_2O_2$ (wt % based on monomer) | Others: initiator | Monomer concentration at initiation of polymerization (%) | Dropping period of (B) (minutes) | Dropping period of aq. $H_2O_2$ (minutes) | Note |
|---|---|---|---|---|---|---|---|---|---|---|
| 1-22 | (1-22) | *2 (120 parts) | 60/40 | 333.3 parts (100%) | 75.5 parts (8.26%) | 15% NAPS 33.3 parts | 50% | 150 minutes | 60 minutes | *4 |

(Footnote) (A): Maleic acid (salt)
(B): Water-soluble ethylenically unsaturated monomer
aq. $H_2O_2$: aqueous hydrogen peroxide solution
*[1] 60% aqueous acrylic acid solution
*[2] 80% aqueous acrylic acid solution
*[3] Ammonium ferrous sulfate hexahydrate was added in an amount of 0.04 parts.
*[4] The 15% NAPS was added dropwise over a 100-minute period after 50 minutes from initiation of polymerization.
*[5] The 15% NAPS was added dropwise over a 70-minute period after 80 minutes from initiation of polymerization.

TABLE 6

| Example | Maleic acid-based copolymer | Molecular weight | $Ca^{2+}$ capturability (mgCaCO$_3$/g) | Hydrogen peroxide concentration at end of polymerization (%) | Amount of residual maleic acid (%) | Clay dispersibility | Gelatability |
|---|---|---|---|---|---|---|---|
| 1-11 | (1-11) | 4,500 | 350 | 1.2 | 1.7 | 1.4 | 0.13 |
| 1-12 | (1-12) | 4,200 | 340 | 0.53 | 0.8 | 1.5 | 0.13 |
| 1-13 | (1-13) | 4,800 | 360 | 0.4 | 0.4 | 1.3 | 0.12 |
| 1-14 | (1-14) | 5,800 | 340 | 0.6 | 0.3 | 1.3 | 0.15 |
| 1-15 | (1-15) | 2,800 | 330 | 0.18 | 1.1 | 1.4 | 0.11 |
| 1-16 | (1-16) | 3,800 | 340 | 0.15 | 1.2 | 1.3 | 0.11 |
| 1-17 | (1-17) | 5,000 | 360 | 0.18 | 0.8 | 1.4 | 0.12 |
| 1-18 | (1-18) | 8,000 | 330 | 0.21 | 0.4 | 1.4 | 0.15 |
| 1-19 | (1-19) | 12,000 | 320 | 0.23 | 0.2 | 1.2 | 0.19 |
| 1-20 | (1-20) | 12,000 | 410 | 0.31 | 1.2 | 1.5 | 0.14 |
| 1-21 | (1-21) | 22,000 | 430 | 0.45 | 2.5 | 1.3 | 0.17 |
| 1-22 | (1-22) | 8,000 | 400 | 0.55 | 2.0 | 1.4 | 0.14 |
| 1-23 | (1-23) | 16,000 | 470 | — | 0.1 | 1.8 | 0.15 |
| 1-24 | (1-24) | 25,000 | 480 | — | 0.2 | 1.5 | 0.16 |
| 1-25 | (1-25) | 12,000 | 430 | — | 0.4 | 1.5 | 0.16 |

EXAMPLE 2-1

Into a four-necked flask having a capacity of 1 liter and equipped with a thermometer, stirrer and reflux condenser were charged 196 parts of maleic anhydride (232 parts as maleic acid), 110.7 parts of deionized water and 333.3 parts of a 48% aqueous sodium hydroxide solution. (A solid content of the resulting aqueous solution was 50% in the initial stage of polymerization.) Then, while stirring, the aqueous solution was heated to its boiling temperature under normal pressure. Next, under stirring conditions, 75.5 parts (8.26% by weight based on maleic acid (salt) (A)) of a 35% aqueous hydrogen peroxide solution was added dropwise continuously over a 60-minute period from initiation of polymerization;

102.86 parts of a 60% aqueous acrylic acid solution (maleic acid/acrylic acid=7/3 mol ratio) was added dropwise continuously over a 150-minute period from initiation of polymerization; and 38.1 parts of a 15% aqueous sodium persulfate solution was added dropwise continuously over a 90-minute period after 60 minutes from initiation of polymerization, whereby a polymerization reaction was completed (the monomer concentration was 50% at initiation of the polymerization).

The weight-average molecular weight of the resulting maleic acid-based copolymer (2-1) and the amount of residual maleic acid were measured using gel permeation chromatography in the same way as of Example 1-1. Their results are shown in Table 9.

The constant of the degree to which a maleic acid-based copolymer contained in a detergent composition of the present invention stabilizes calcium ions is defined as the numerical value obtained by substituting in the formula 1 a numerical value obtained under the below-mentioned measurement conditions.

(1) Calcium ion solutions having concentrations of 0.002 mol/L, 0.003 mol/L and 0.004 mol/L respectively were prepared (using $CaCl_2$) and 50 g of each solution was charged into a 100 cc beaker;

(2) 50 mg (calculated as a solid content) of a maleic acid-based copolymer was added;

(3) the pH was adjusted to 10;

(4) 0.15 g of NaCl was added as a stabilizer for a calcium ion electrode; and (5) the concentration of free calcium ions was measured using the calcium ion electrode.

When the concentration of free calcium ions is denoted by [Ca], the concentration of fixed calcium ions by [CaS], free chelate sites by [S], the number of chelate sites by [S0], and the stabilization degree constant by Log K; then [Ca][S]/[CaS]=1/K and [S]=[S0]−[CaS]. Accordingly, [Ca]/[CaS]= 1/[S0].[Ca]+1/[S0].K.

Thus, [Ca]/[CaS] was plotted on the vertical axis and [Ca] was plotted on the horizontal axis to determine [S0], K and Log K from the slope and intercept.

The level of adsorption to clay particles of a maleic acid-based copolymer contained in a detergent composition of the present invention is defined as the numerical value calculated from a value measured by the below-mentioned measurement method.

Conditions for measuring the level of adsorption to clay particles:

Vessel: 100 cc measuring cylinder

Polymer solution: 1 cc of a 0.5% (calculated as a solid content) aqueous polymer solution+100 g of supply water of Himeji-city, Japan Clay: 1.0 g of Amazon clay Stirring period: 10 minutes (using a magnetic stirrer)

Stationary standing period: 18 hours

Measurement method: 10 cc of an uppermost portion of the solution in the measuring cylinder was sampled, the supernatant was filtrated, and the level of adsorption was measured using the forementioned gel permeation chromatography.

The above-mentioned measurement was repeated under the above-mentioned measured value and conditions except that no clay was used, whereby the level of adsorption to clay particles was calculated according to the following formula.

Level of adsorption to clay particles=(polymer peak area in the case where clay was added)/(polymer peak area in a clay-free system)×100 (%)

When the level is within the range of 40 to 60%, it is very optimal.

When the level is within the range of 30 to 70%, it is optimal.

When the level is within the range of 20 to 90%, it is suitable.

When the level is within the range of 90 to 95% or within the range of 10 to 20%, but excluding 90% and 20%, it is unsuitable.

When the level is higher than 95% or lower than 10%, it is very unsuitable.

EXAMPLE 2-2

The polymerization of Example 2-1 was repeated except that the 35% aqueous hydrogen peroxide solution was added dropwise over a 150-minute period at a rate which was decreased gradually and linearly from 1.5 to 0.1 cc/min. Then the same analyses as of Example 2-1 were carried out. Results are shown in Table 9 (the monomer concentration was 50% at initiation of the polymerization).

EXAMPLE 2-3

The polymerization of Example 2-1 was repeated except that the 35% aqueous hydrogen peroxide solution was added dropwise over a 150-minute period wherein 65.0 parts of the solution was added continuously over an initial 60-minute period and then 10.5 parts of the solution was added continuously over a 90-minute period. Then the same analyses as of Example 2-1 were carried out. Results are shown in Table 9 (the monomer concentration was 50% at initiation of the polymerization).

EXAMPLE 2-4

The polymerization of Example 2-1 was repeated except that 360 parts was used instead of 102.86 parts of the 60% aqueous acrylic acid solution. Then the same analyses as of Example 2-1 were carried out. Results are shown in Table 9 (the monomer concentration was 50% at initiation of the polymerization).

EXAMPLES 2-5 TO 2-11

The polymerization of Example 2-1 was repeated except that the water-soluble ethylenically unsaturated monomers (B), as described in Tables 7, 8 and 10, were used in the amount, as described in the same Tables, instead of the 60% aqueous acrylic acid solution. Then the same analyses as of Example 2-1 were carried out. Results are shown in Tables 9 and 12 (the monomer concentration was 50% at initiation of the polymerization).

EXAMPLES 2-12 TO 2-14

The polymerization of Example 2-1 was repeated except that the 60% aqueous acrylic acid solution was used as the water-soluble ethylenically unsaturated monomer (B) in such an amount as described in Table 10, and that 38.1 parts of a 15% aqueous sodium persulfate solution was added dropwise continuously over a 100-minute period after 50 minutes from initiation of the polymerization. Then the same analyses as of Example 2-1 were carried out. Results are shown in Table 12 (the monomer concentration was 50% at initiation of the polymerization).

EXAMPLE 2-15

The polymerization of Example 2-1 was repeated except that the amount of the 48% aqueous sodium hydroxide solution was changed to 50 parts, and that 0.04 parts of ammonium ferrous sulfate hexahydrate was further charged into the flask. Then the same analyses as of Example 2-1 were carried out. Results are shown in Table 12 (the monomer concentration was 68.7% at initiation of the polymerization).

EXAMPLES 2-16 TO 2-19

The polymerization of Example 2-15 was repeated except that the amount of the 60% aqueous acrylic acid solution and the amount used of hydrogen peroxide were those described in Tables 10 and 11. Then the same analyses as of Example 2-1 were carried out. Results are shown in Table 12 (the monomer concentration was 68.7% at initiation of the polymerization).

EXAMPLES 2-20

The polymerization of Example 2-1 was repeated except: that 45.7 parts (5.0% by weight based on maleic acid (salt) (A)) of the 35% aqueous hydrogen peroxide solution was added dropwise continuously over a 60-minute period from initiation of the polymerization; that 26.7 parts (1 g per 1 mol of the charged monomers) of a 15% aqueous sodium persulfate solution was added dropwise continuously over a 90-minute period after 60 minutes from initiation of the polymerization; and that 420.7 parts of an 80% aqueous acrylic acid solution (maleic acid/acrylic acid=5/5 mol ratio) was added dropwise continuously over a 150-minute period instead of 102.86 parts of the 60% aqueous acrylic acid solution. Then the same analyses as of Example 2-1 were carried out. Results are shown in Table 12 (the monomer concentration was 50% at initiation of the polymerization).

EXAMPLES 2-21

The polymerization of Example 2-20 was repeated except: that the 35% aqueous hydrogen peroxide solution was added over an 80-minute period from initiation of the polymerization; that the 15% aqueous sodium persulfate solution was added over a 70-minute period after 80 minutes from initiation of the polymerization; and that the amount of the 80% aqueous acrylic acid solution was changed to 270.5 parts. Then the same analyses as of Example 2-1 were carried out. Results are shown in Table 12 (the monomer concentration was 50% at initiation of the polymerization).

EXAMPLES 2-22

The polymerization of Example 2-20 was repeated except: that the added amount of the 35% aqueous hydrogen peroxide solution was 57.1 parts (6.25% by weight based on the monomers); that the added amount of the 15% aqueous sodium persulfate solution was 33.3 parts (1.5 g per 1 mol of the charged monomers); and that the added amount of the 80% aqueous acrylic acid solution was 220.4 parts (maleic acid/acrylic acid=6/4 mol ratio). Then the same analyses as of Example 2-1 were carried out. Results are shown in Table 12 (the monomer concentration was 50% at initiation of the polymerization).

EXAMPLES 2-23

Low molecular weight contents were removed from the maleic acid-based copolymer (2-20), obtained in Example 2-20, using a dialyzing membrane having a differential molecular weight of 1,000 (SPECTRA-PORE 6 made by IEDA TRADING Co.), whereby a maleic acid-based copolymer (2-23) was obtained. Then the same analyses as of Example 2-1 were carried out. Results are shown in Table 12.

Treating conditions:
    ion-exchanged water: 1 liter
    vessel: 1 liter beaker
    polymer: 50 g
    treating period: 24 hours

EXAMPLES 2-24 and 2-25

The maleic acid-based copolymers (2-21) and (2-22), obtained in Examples 2-21 and 2-22, were treated in the same way as of Example 2-23, whereby maleic acid-based copolymers (2-24) and (2-25) were obtained. Then the same analyses as of Example 2-1 were carried out. Results are shown in Table 12.

TABLE 7

| Example | Maleic acid-based copolymer | (B) (parts) | (A)/(B) (mole ratio) | 48% NaOH charged initially (parts) (neutralization degree %) | 35% aq. H$_2$O$_2$ (wt % based on (A)) | Others: initiator | Monomer concentration at initiation of polymerization (%) | Dropping period of (B) (minutes) | Dropping period of aq. H$_2$O$_2$ (minutes) | Note |
|---|---|---|---|---|---|---|---|---|---|---|
| 2-1 | (2-1) | *1 (102.86 parts) | 70/30 | 333.3 parts (100%) | 75.5 parts (8.26%) | 15% NAPS 38.1 parts | 50% | 150 minutes | 120 minutes | — |
| 2-2 | (2-2) | *1 (102.86 parts) | 70/30 | 333.3 parts (100%) | 75.5 parts (8.26%) | 15% NAPS 38.1 parts | 50% | 150 minutes | 150 minutes | *2 |
| 2-3 | (2-3) | *1 (102.86 parts) | 70/30 | 333.3 parts (100%) | 75.5 parts (8.26%) | 15% NAPS 38.1 parts | 50% | 150 minutes | 150 minutes | *3 |
| 2-4 | (2-4) | *1 (360 parts) | 70/30 | 333.3 parts (100%) | 75.5 parts (8.26%) | 15% NAPS 38.1 parts | 50% | 150 minutes | 120 minutes | *4 |
| 2-5 | (2-5) | *1 (122.7 parts) | 40/60 | 333.3 parts (100%) | 75.5 parts (8.26%) | 15% NAPS 38.1 parts | 50% | 150 minutes | 120 minutes | — |

(Footnote)
(A): Maleic acid (salt)
(B): Water-soluble ethylenically unsaturated monomer
aq. H$_2$O$_2$: aqueous hydrogen peroxide solution
15% NAPS: 15% aqueous sodium persulfate solution
*1 60% aqueous acrylic acid solution
*2 The dropping rate of the aq. H$_2$O$_2$ was decreased gradually and linearly from 1.5 to 0.1 cc/min.
*3 Sixty parts of the aq. H$_2$O$_2$ was added dropwise over an initial 60-minute period.
*4 The 15% NAPS was added dropwise over a 100-minute period after 50 minutes from initiation of polymerization.

TABLE 8

| Example | Maleic acid-based copolymer | (B) (parts) | (A)/(B) (mole ratio) | 48% NaOH charged initially (parts) (neutralization degree %) | 35% aq. $H_2O_2$ (wt % based on (A)) | Others: initiator | Monomer concentration at initiation of polymerization (%) | Dropping period of (B) (minutes) | Dropping period of aq. $H_2O_2$ (minutes) | Note |
|---|---|---|---|---|---|---|---|---|---|---|
| 2-6 | (2-6) | *1 (286.3 parts) | 50/50 | 333.3 parts (100%) | 75.5 parts (8.26%) | 15% NAPS 38.1 parts | 50% | 150 minutes | 120 minutes | — |
| 2-7 | (2-7) | *2 (922 parts) + *1 (102.86 parts) | 53.8/ 46.2 | 333.3 parts (100%) | 75.5 parts (8.26%) | 15% NAPS 38.1 parts | 50% | 150 minutes | 120 minutes | — |
| 2-8 | (2-8) | *3 (102.86 parts) + *1 (102.86 parts) | 53.8/ 46.2 | 333.3 parts (100%) | 75.5 parts (8.26%) | 15% NAPS 38.1 parts | 50% | 150 minutes | 120 minutes | — |
| 2-9 | (2-9) | *4 (49.6 parts) + *1 (102.86 parts) | 53.8/ 46.2 | 333.3 parts (100%) | 75.5 parts (8.26%) | 15% NAPS 38.1 parts | 50% | 150 minutes | 120 minutes | — |
| 2-10 | (2-10) | *5 (268.2 parts) | 70/30 | 333.3 parts (100%) | 75.5 parts (8.26%) | 15% NAPS 38.1 parts | 50% | 150 minutes | 120 minutes | — |

(Footnote)
(A): Maleic acid (salt)
(B): Water-soluble ethylenically unsaturated monomer
aq. $H_2O_2$: aqueous hydrogen peroxide solution
*1: 60% aqueous acrylic acid solution
*2: 20% aqueous sodium 2-hydroxy-3-allyloxypropanesulfonate solution
*3: 5 mol EO-added isoprenol
*4: allyl alcohol
*5: 30% aqueous sodium acrylate solution

TABLE 9

| Example | Maleic acid-based copolymer | Molecular weight | Calcium ion stabilization degree constant | Level of adsorption to clay particles (%) | Gelability |
|---|---|---|---|---|---|
| 2-1 | (2-1) | 2,500 | 4.6 | 34 | 0.13 |
| 2-2 | (2-2) | 2,800 | 4.6 | 58 | 0.13 |
| 2-3 | (2-3) | 3,000 | 4.6 | 57 | 0.13 |
| 2-4 | (2-4) | 10,000 | 4.8 | 50 | 0.16 |
| 2-5 | (2-5) | 2,300 | 4.5 | 29 | 0.12 |
| 2-6 | (2-6) | 3,200 | 4.7 | 55 | 0.12 |
| 2-7 | (2-7) | 3,200 | 4.2 | 80 | 0.03 |
| 2-8 | (2-8) | 3,000 | 4.2 | 73 | 0.05 |
| 2-9 | (2-9) | 3,200 | 4.2 | 80 | 0.04 |
| 2-10 | (2-10) | 3,500 | 4.7 | 58 | 0.15 |
| 2-11 | (2-11) | 4,200 | 4.8 | 54 | 0.14 |
| 2-12 | (2-12) | 11,000 | 4.9 | 45 | 0.16 |

TABLE 10

| Example | Maleic acid-based copolymer | (B) (parts) | (A)/(B) (mole ratio) | 48% NaOH charged initially (parts) (neutralization degree %) | 35% aq. H$_2$O$_2$ (wt % based on monomer) | Others: initiator | Monomer concentration at initiation of polymerization (%) | Dropping period of (B) (minutes) | Dropping period of aq. H$_2$O$_2$ (minutes) | Note |
|---|---|---|---|---|---|---|---|---|---|---|
| 2-11 | (2-11) | *1 (625.8 parts) | 50/50 | 333.3 parts (100%) | 75.5 parts (8.26%) | 15% NAPS 38.1 parts | 50% | 150 minutes | 120 minutes | — |
| 2-12 | (2-12) | *2 (360 parts) | 40/60 | 333.3 parts (100%) | 75.5 parts (8.26%) | 15% NAPS 38.1 parts | 50% | 150 minutes | 120 minutes | *3 |
| 2-13 | (2-13) | *2 (560 parts) | 30/70 | 333.3 parts (100%) | 75.5 parts (8.26%) | 15% NAPS 38.1 parts | 50% | 150 minutes | 120 minutes | *3 |
| 2-14 | (2-14) | *2 (960 parts) | 20/86 | 333.3 parts (100%) | 75.5 parts (8.26%) | 15% NAPS 38.1 parts | 50% | 150 minutes | 120 minutes | *3 |
| 2-15 | (2-15) | *2 (102.86 parts) | 70/30 | 50 parts (15%) | 75.5 parts (10.78%) | 15% NAPS 38.1 parts | 68.7% | 150 minutes | 120 minutes | *4 |
| 2-16 | (2-16) | *2 (160 parts) | 60/40 | 50 parts (15%) | 75.5 parts (10.78%) | 15% NAPS 38.1 parts | 68.7% | 150 minutes | 120 minutes | *4 |

(Footnote)
(A): Maleic acid (salt)
(B): Water-soluble ethylenically unsaturated monomer
aq. H$_2$O$_2$: aqueous hydrogen peroxide solution
*1: 30% sodium acrylate
*2: 60% aqueous acrylic acid solution
*3: The 15% NAPS was added dropwise over a 100-minute period after 50 minutes from initiation of polymerization.
*4: Ammonium ferrous sulfate hexahydrate was added in an amount of 0.04 parts.

TABLE 11

| Example | Maleic acid-based copolymer | (B) (parts) | (A)/(B) (mole ratio) | 48% NaOH charged initially (parts) (neutralization degree %) | 35% aq. H$_2$O$_2$ (wt % based on monomer) | Others: initiator | Monomer concentration at initiation of polymerization (%) | Dropping period of (B) (minutes) | Dropping period of aq. H$_2$O$_2$ (minutes) | Note |
|---|---|---|---|---|---|---|---|---|---|---|
| 2-17 | (2-17) | *1 (240 parts) | 50/50 | 50 parts (15%) | 75.5 parts (10.78%) | 15% NAPS 38.1 parts | 68.7% | 150 minutes | 120 minutes | *3 |
| 2-18 | (2-18) | *1 (560 parts) | 30/70 | 50 parts (15%) | 75.5 parts (10.78%) | 15% NAPS 38.1 parts | 68.7% | 150 minutes | 120 minutes | *3 |
| 2-19 | (2-19) | *1 (960 parts) | 20/80 | 50 parts (15%) | 75.5 parts (10.78%) | 15% NAPS 38.1 parts | 68.7% | 150 minutes | 120 minutes | *3 |
| 2-20 | (2-20) | *2 (420.7 parts) | 30/70 | 333.3 parts (100%) | 75.5 parts (8.26%) | 15% NAPS 26.7 parts | 50% | 150 minutes | 60 minutes | *4 |
| 2-21 | (2-21) | *2 (270.5 parts) | 40/60 | 333.3 parts (100%) | 75.5 parts (8.26%) | 15% NAPS 26.7 parts | 50% | 150 minutes | 80 minutes | *5 |

TABLE 11-continued

| Example | Maleic acid-based copolymer | (B) (parts) | (A)/(B) (mole ratio) | 48% NaOH charged initially (parts) (neutralization degree %) | 35% aq. H$_2$O$_2$ (wt % based on monomer) | Others: initiator | Monomer concentration at initiation of polymerization (%) | Dropping period of (B) (minutes) | Dropping period of aq. H$_2$O$_2$ (minutes) | Note |
|---|---|---|---|---|---|---|---|---|---|---|
| 2-22 | (2-22) | *2 (220.4 parts) | 45/55 | 333.3 parts (100%) | 75.5 parts (8.26%) | 15% NAPS 33.3 parts | 50% | 150 minutes | 60 minutes | *4 |

(Footnote)
(A): Maleic acid (salt)
(B): Water-soluble ethylenically unsaturated monomer
aq. H$_2$O$_2$: aqueous hydrogen peroxide solution
*1: 60% aqueous acrylic acid solution
*2: 80% aqueous acrylic acid solution
*3: Ammonium ferrous sulfate hexahydrate was added in an amount of 0.04 parts.
*4: The 15% NAPS was added dropwise over a 100-minute period after 50 minutes from initiation of polymerization.
*5: The 15% NAPS was added dropwise over a 70-minute period after 80 minutes from initiation of polymerization.

TABLE 12

| Example | Maleic acid-based copolymer | Molecular weight | Calcium ion stabilization degree constant | Level of adsorption to clay particles (%) | Gelability |
|---|---|---|---|---|---|
| 2-13 | (2-13) | 13,000 | 4.7 | 40 | 0.17 |
| 2-14 | (2-14) | 15,000 | 4.3 | 48 | 0.17 |
| 2-15 | (2-15) | 2,500 | 4.5 | 28 | 0.11 |
| 2-16 | (2-16) | 3,500 | 4.6 | 38 | 0.13 |
| 2-17 | (2-17) | 4,000 | 4.7 | 55 | 0.14 |
| 2-18 | (2-18) | 7,500 | 4.6 | 51 | 0.13 |
| 2-19 | (2-19) | 11,000 | 4.5 | 54 | 0.15 |
| 2-20 | (2-20) | 16,500 | 4.6 | 55 | 0.18 |
| 2-21 | (2-21) | 14,000 | 4.8 | 40 | 0.17 |
| 2-22 | (2-22) | 13,000 | 4.8 | 47 | 0.17 |
| 2-23 | (2-23) | 15,000 | 4.7 | 42 | 0.15 |
| 2-24 | (2-24) | 15,000 | 5.0 | 58 | 0.16 |
| 2-25 | (2-25) | 15,000 | 5.0 | 45 | 0.17 |

COMPARATIVE EXAMPLES 1-1 AND 1-2
(influence of the amount of hydrogen peroxide)

The polymerization of Example 1-1 was repeated except that the used amount of the 35% aqueous hydrogen peroxide solution was as described in Table 13. Then the same analyses as of Example 1-1 and Example 2-1 were carried out. Results are shown in Table 14 (the monomer concentration was 50% at initiation of the polymerization).

COMPARATIVE EXAMPLE 1-3

The polymerization of Example 1-1 was repeated except that the amount of the 60% aqueous acrylic acid solution was 7,760 parts, and that 5,000 parts of deionized water and 887.7 parts (2 g per 1 mol of the charged monomers) of a 15% aqueous sodium persulfate solution were further added dropwise continuously over a 150-minute period. Then the same analyses as of Comparative Example 1-1 were carried out. Results are shown in Table 14 (the monomer concentration was 50% at initiation of the polymerization).

COMPARATIVE EXAMPLE 1-4

The polymerization of Example 1-1 was repeated except that the amount of the 60% aqueous acrylic acid solution was as described in Table 13. Then the same analyses as of Comparative Example 1-1 were carried out. Results are shown in Table 14 (the monomer concentration was 50% at initiation of the polymerization).

COMPARATIVE EXAMPLE 1-5

The polymerization of Example 1-1 was repeated except that the used amount of the deionized water was 537.4 parts. Then the same analyses as of Comparative Example 1-1 were carried out. Results are shown in Table 14 (the monomer concentration was 30% at initiation of the polymerization).

COMPARATIVE EXAMPLE 1-6

The polymerization of Example 1-1 was repeated except that the used amount of maleic anhydride was 117.6 parts (139.2 parts as maleic acid), and that 78.4 parts of maleic anhydride (92.8 parts as maleic acid) was added continuously over a 120-minute period from initiation of the polymerization. Then the same analyses as of Comparative Example 1-1 were carried out. Results are shown in Table 14 (the monomer concentration was 45.6% at initiation of the polymerization).

COMPARATIVE EXAMPLE 1-7

The polymerization of Example 1-1 was repeated except that the period over which each of the 35% aqueous hydrogen peroxide solution and the 60% aqueous acrylic acid solution was added was 20 minutes. Then the same analyses as of Comparative Example 1-1 were carried out. Results are shown in Table 14 (the monomer concentration was 50% at initiation of the polymerization).

COMPARATIVE EXAMPLE 1-8

The polymerization of Example 1-1 was repeated except that the period over which each of the 35% aqueous hydrogen peroxide solution and the 60% aqueous acrylic acid solution was added was 600 minutes. Then the same analyses as of Comparative Example 1-1 were carried out. Results are shown in Table 14 (the monomer concentration was 50% at initiation of the polymerization).

TABLE 13

| Comp. Example | Comp. maleic acid-based copolymer | (B) (parts) | (A)/(B) (mole ratio) | 48% NaOH charged initially (parts) (neutralization degree %) | 35% aq. H₂O₂ (wt % based on monomer) | Others: initiator | Monomer concentration at initiation of polymerization (%) | Dropping period of (B) (minutes) | Dropping period of aq. H₂O₂ (minutes) | Note |
|---|---|---|---|---|---|---|---|---|---|---|
| 1-1 | (1-1) | *1 (102.86 parts) | 70/30 | 333.3 parts (100%) | 250 parts (29.8%) | — | 50% | 150 minutes | 120 minutes | — |
| 1-2 | (1-2) | *1 (102.86 parts) | 30/70 | 333.3 parts (100%) | 16.78 parts (2.0%) | — | 50% | 150 minutes | 120 minutes | — |
| 1-3 | (1-3) | *1 (7,760 parts) | 3/97 | 333.3 parts (100%) | 755 parts (5.4%) | 15% NAPS 887.7 parts | 50% | 150 minutes | 120 minutes | *2 |
| 1-4 | (1-4) | *1 (7.42 parts) | 97/3 | 333.3 parts (100%) | 75.5 parts (11%) | — | 50% | 150 minutes | 120 minutes | — |
| 1-5 | (1-5) | *1 (102.86 parts) | 70/30 | 333.3 parts (100%) | 75.5 parts (9.0%) | — | 30% | 150 minutes | 120 minutes | *3 |
| 1-6 | (1-6) | *1 (102.86 parts) | 70/30 | 333.3 parts (100%) | 75.5 parts (9.0%) | — | 45.6% | 150 minutes | 120 minutes | *4 |
| 1-7 | (1-7) | *1 (102.86 parts) | 70/30 | 333.3 parts (100%) | 75.5 parts (9.0%) | — | 50% | 20 minutes | 20 minutes | — |
| 1-8 | (1-8) | *1 (102.86 parts) | 70/30 | 333.3 parts (100%) | 75.5 parts (9.0%) | — | 50% | 600 minutes | 600 minutes | — |

(Footnote)
Comp.: comparative
(A): Maleic acid (salt)
(B): Water-soluble ethylenically unsaturated mononer
aq. H₂O₂: aqueous hydrogen peroxide solution
*1: 60% aqueous acrylic acid solution
*2: Five thousand parts of deionized water and the 15% NAPS were added dropwise over a 150-minute period from initiation of the polymerization.
*3: Deionized water was used in an amount of 537.4 parts.
*4: Of 117.6 parts of maleic anhydride, 78.4 parts was added over a 120-minute period from initiation of the polymerization.

TABLE 14

| Comp. Example | Comp. maleic acid-based copolymer | Molecular weight | $Ca^{2+}$ capturability (mg $CaCO_3$/g) | Hydrogen peroxide concentration at end of polymerization (%) | Amount of residual maleic acid (%) | Clay dispersibility | Gelatability | Calcium ion stabilization degree constant | Level of adsorption to clay particles (%) |
|---|---|---|---|---|---|---|---|---|---|
| 1-1 | (1-1) | 2,200 | 220 | 2.5 | 0.1 | 1.3 | 0.21 | 3.9 | 18 |
| 1-2 | (1-2) | 2,500 | 190 | 0.1 | 19.0 | 1.1 | 0.21 | 3.8 | 15 |
| 1-3 | (1-3) | 5,200 | 170 | 1.3 | 0.1 | 0.8 | 0.25 | 3.8 | 17 |
| 1-4 | (1-4) | 800 | 180 | 0.8 | 3.5 | 0.8 | 0.21 | 3.7 | 13 |
| 1-5 | (1-5) | 1,500 | 180 | 2.8 | 15.3 | 0.9 | 0.22 | 3.8 | 19 |
| 1-6 | (1-6) | 2,500 | 190 | 2.1 | 17.0 | 0.9 | 0.23 | 3.9 | 17 |
| 1-7 | (1-7) | 1,800 | 180 | 4.5 | 21.0 | 0.9 | 0.22 | 3.8 | 18 |
| 1-8 | (1-8) | 2,500 | 190 | 0.8 | 0.8 | 1.3 | 0.21 | 3.9 | 15 |

EXAMPLES 3-1 TO 3-25

The below-mentioned washing performance test was carried out to evaluate abilities as detergent compositions of maleic acid-based copolymers (1-1) to (1-25).

Artificial grime shown in Table 15 was dispersed into carbon tetrachloride to prepare an artificial grime solution, and white cotton cloth was passed through the artificial grime solution, dried and cut to make 10 cm×10 cm dirty cloth.

The detergent composition shown in Table 16 was formulated to wash the dirty cloth under the conditions shown in Table 17. After the washing, the cloth was dried and then its reflectivity was measured.

The washed ratio of the dirty cloth was determined from its reflectivity using the following formula:

washed ratio=(reflectivity after washing—reflectivity before washing)/(reflectivity of white cloth—reflectivity before washing)×100 to evaluate the washing performance. Results are shown in Table 18.

COMPARATIVE EXAMPLES 3-1 TO 3-8

The washed ratios were measured using the comparative maleic acid-based copolymers (1-1) to (1-8) in the same way as of Examples 3-1 to 3-25. Results are shown in Table 19.

TABLE 15

(Composition of grime)

| Components | % by weight |
| --- | --- |
| Carbon black (designated by JAPAN OIL CHEMIST'S SOCIETY) | 0.5 |
| Clay | 49.75 |
| Myristylic acid | 8.3 |
| Oleic acid | 8.3 |
| Tristearic acid | 8.3 |
| Triolein | 8.3 |
| Cholesterin | 4.38 |
| Cholesterin stearate | 1.09 |
| Paraffin wax (m.p. 50–52° C.) | 0.552 |
| Squalene | 0.552 |

TABLE 16

(Detergent composition)

| Components | % by weight |
| --- | --- |
| Sodium salt of linear chain alkylbenzenesulfonic acid (C = 11.5) | 20 |
| Polyoxyethylene alkyl ether (C = 12, EO = 8) | 15 |
| Zeolite | 20 |
| Enzyme (protease) | 0.5 |
| Maleic acid-based polymer | 20 |
| Sodium carbonate | 15 |
| #1 Sodium silicate | 9.5 |

TABLE 17

Washing conditions

| | |
| --- | --- |
| Temperature | 20° C. |
| Bath ratio | 1/60 |
| Detergent concentration | 0.5% |
| Water quality | Tap water |
| Terg-O-Tometer | 10 minutes |

(Footnote)
Terg-O-Tometer: made by Ueshima Seisakusho Co., Ltd.

TABLE 18

(Evaluation as detergent composition)

| Example | Maleic acid-based copolymer | Washed ratio (%) |
| --- | --- | --- |
| 3-1 | (1-1) | 95 |
| 3-2 | (1-2) | 93 |
| 3-3 | (1-3) | 96 |
| 3-4 | (1-4) | 94 |
| 3-5 | (1-5) | 95 |
| 3-6 | (1-6) | 95 |
| 3-7 | (1-7) | 92 |
| 3-8 | (1-8) | 93 |
| 3-9 | (1-9) | 94 |
| 3-10 | (1-10) | 91 |
| 3-11 | (1-11) | 94 |
| 3-12 | (1-12) | 94 |
| 3-13 | (1-13) | 91 |
| 3-14 | (1-14) | 93 |
| 3-15 | (1-15) | 95 |
| 3-16 | (1-16) | 96 |
| 3-17 | (1-17) | 95 |
| 3-18 | (1-18) | 96 |
| 3-19 | (1-19) | 93 |
| 3-20 | (1-20) | 99 |
| 3-21 | (1-21) | 97 |
| 3-22 | (1-22) | 98 |
| 3-23 | (1-23) | 100 |
| 3-24 | (1-24) | 98 |
| 3-25 | (1-25) | 97 |

TABLE 19

(Evaluation as detergent composition)

| Comparative Example | Comparative maleic acid-based copolymer | Washed ratio (%) |
| --- | --- | --- |
| 3-1 | (1-1) | 87 |
| 3-2 | (1-2) | 83 |
| 3-3 | (1-3) | 82 |
| 3-4 | (1-4) | 84 |
| 3-5 | (1-5) | 85 |
| 3-6 | (1-6) | 84 |
| 3-7 | (1-7) | 87 |
| 3-8 | (1-8) | 81 |

EXAMPLES 4-1 TO 4-25

The below-mentioned washing performance test was carried out to evaluate abilities as detergent compositions of maleic acid-based copolymers (2-1) to (2-25).

Artificial grime shown in Table 15 was dispersed into carbon tetrachloride to prepare an artificial grime solution, and white cotton cloth was passed through the artificial grime solution, dried and cut to make 10 cm×10 cm dirty cloth.

The detergent composition shown in Table 16 was formulated to wash the dirty cloth under the conditions shown in Table 20. After the washing, the cloth was dried and then its reflectivity was measured.

The washed ratio of the dirty cloth was determined from its reflectivity using the following formula:

washed ratio=(reflectivity after washing—reflectivity before washing)/(reflectivity of white cloth—reflectivity before washing)×100 to evaluate the washing performance. Results are shown in Table 21.

COMPARATIVE EXAMPLES 4-1 TO 4-8

The washed ratios were measured using the comparative maleic acid-based copolymers (1-1) to (1-8) in the same way as of Examples 4-1 to 4-25. Results are shown in Table 22.

TABLE 20

Washing conditions

| | |
| --- | --- |
| Temperature | 20° C. |
| Bath ratio | 1/60 |
| Detergent concentration | 0.5% |
| Water quality | Tap water |

TABLE 20-continued

Washing conditions

| | |
|---|---|
| Terg-O-Tometer | 10 minutes |
| Amount of washing water | 500 cc |
| Clay (red earth) | 3 g |

(Footnote)
Terg-O-Tometer: made by Ueshima Seisakusho Co., Ltd.

TABLE 21

(Evaluation as detergent composition)

| Example | Maleic acid-based copolymer | Washed ratio (%) |
|---|---|---|
| 4-1 | (2-1) | 94 |
| 4-2 | (2-2) | 94 |
| 4-3 | (2-3) | 95 |
| 4-4 | (2-4) | 97 |
| 4-5 | (2-5) | 94 |
| 4-6 | (2-6) | 95 |
| 4-7 | (2-7) | 91 |
| 4-8 | (2-8) | 91 |
| 4-9 | (2-9) | 90 |
| 4-10 | (2-10) | 93 |
| 4-11 | (2-11) | 94 |
| 4-12 | (2-12) | 96 |
| 4-13 | (2-13) | 95 |
| 4-14 | (2-14) | 92 |
| 4-15 | (2-15) | 92 |
| 4-16 | (2-16) | 95 |
| 4-17 | (2-17) | 94 |
| 4-18 | (2-18) | 95 |
| 4-19 | (2-19) | 94 |
| 4-20 | (2-20) | 97 |
| 4-21 | (2-21) | 96 |
| 4-22 | (2-22) | 98 |
| 4-23 | (2-23) | 98 |
| 4-24 | (2-24) | 97 |
| 4-25 | (2-25) | 97 |

TABLE 22

(Evaluation as detergent composition)

| Comparative Example | Comparative maleic acid-based copolymer | Washed ratio (%) |
|---|---|---|
| 4-1 | (1-1) | 84 |
| 4-2 | (1-2) | 81 |
| 4-3 | (1-3) | 80 |
| 4-4 | (1-4) | 82 |
| 4-5 | (1-5) | 82 |
| 4-6 | (1-6) | 81 |
| 4-7 | (1-7) | 85 |
| 4-8 | (1-8) | 78 |

EXAMPLES 5-1 TO 5-22 (performance as water-treating agents)

To evaluate performance of the maleic acid-based copolymers (1-1) to (1-22) as water-treating agents, the following scale-inhibitability test was carried out.

Into a glass bottle having a capacity of 225 ml was charged 170 g of water, and into this water were mixed 10 g of a 1.56% aqueous solution of calcium chloride dihydrate and 3 g of a 0.02% aqueous solution of each maleic acid polymer sample (3 ppm based on the resulting supersaturated aqueous solution). Moreover, 10 g of an aqueous sodium hydrogen carbonate solution and 7 g of sodium chloride were added to form 200 g of a supersaturated aqueous solution of calcium carbonate having a concentration of 530 ppm. This supersaturated aqueous solution was sealed and heated at 70° C. for 8 hours. After cooling, precipitates was filtrated by a 0.1 μm membrane filter and the filtrate was analyzed according to JIS K 0101.

The calcium carbonate scale-inhibiting ratios (%) were determined from the following formula. Their results are shown in Table 23.

Scale-inhibiting ratio (%)=(C-B)/(A-B)×100 where:
A is a concentration (%) of calcium which was dissolved in the solution before the test;
B is a concentration (%) of calcium in the filtrate to which no scale inhibitor was added; and
C is a concentration (%) of calcium in the filtrate after the test.

COMPARATIVE EXAMPLES 5-1 TO 5-8

The calcium carbonate scale-inhibiting ratios (%) were measured using the comparative maleic acid-based copolymers (1-1) to (1-8) in the same way as of Examples 5-1 to 5-22. Their results are shown in Table 24.

TABLE 23

(Performance as water-treating agents)

| Example | Maleic acid-based copolymer | Scale inhibiting ratio (%) |
|---|---|---|
| 5-1 | (1-1) | 78 |
| 5-2 | (1-2) | 75 |
| 5-3 | (1-3) | 72 |
| 5-4 | (1-4) | 75 |
| 5-5 | (1-5) | 77 |
| 5-6 | (1-6) | 76 |
| 5-7 | (1-7) | 70 |
| 5-8 | (1-8) | 75 |
| 5-9 | (1-9) | 79 |
| 5-10 | (1-10) | 75 |
| 5-11 | (1-11) | 73 |
| 5-12 | (1-12) | 72 |
| 5-13 | (1-13) | 78 |
| 5-14 | (1-14) | 71 |
| 5-15 | (1-15) | 74 |
| 5-16 | (1-16) | 75 |
| 5-17 | (1-17) | 73 |
| 5-18 | (1-18) | 79 |
| 5-19 | (1-19) | 78 |
| 5-20 | (1-20) | 73 |
| 5-21 | (1-21) | 71 |
| 5-22 | (1-22) | 74 |

TABLE 24

(Performance as water-treating agents)

| Comparative Example | Comparative maleic acid-based copolymer | Scale inhibiting ratio (%) |
|---|---|---|
| 5-1 | (1-1) | 63 |
| 5-2 | (1-2) | 58 |
| 5-3 | (1-3) | 62 |
| 5-4 | (1-4) | 60 |
| 5-5 | (1-5) | 62 |
| 5-6 | (1-6) | 63 |
| 5-7 | (1-7) | 61 |
| 5-8 | (1-8) | 59 |

EXAMPLES 5-23 TO 5-44 (evaluation as fiber-treating agents)

To evaluate performance of the maleic acid-based copolymers (1-1) to (1-22) as fiber-treating agents, the following fiber-bleaching test was carried out.

The maleic acid-based copolymers were used in an amount of 2 g/l as fiber-treating agents to bleach plain stitch-knitted, scoured cotton fabrics under the following conditions. Results thereof are shown in Table 25.

(Bleaching conditions):

Hardness of water used: 35·DH

Bath ratio: 1:25

Temperature: 85° C.

Period: 30 minutes

Chemicals used:

Hydrogen peroxide: 10 g/l

Sodium hydroxide: 2 g/l

3 Sodium silicate: 5 g/l (Evaluation):

The feeling of the treated cloth was judged by a sensory examination method.

The degree of whiteness was measured using a 3M color computer SM-3 model, made by SUGA TEST MACHINE Co., to determine the degree of whiteness (W) from the following whiteness degree formula in a Lab system for evaluation.

$$W=100-[(100-L)^2+a^2+b^2]^{1/2}$$

where:

L is a lightness measured;

a is a chromatic index measured; and b is a chromatic index measured.

The sewability was evaluated by the number of places where base yarn of the cloth was broken in the case where 4 sheets of the cloth were placed upon each other to sew them by 30 cm using a needle #11S by a main sewing machine, but using no sewing yarn.

COMPARATIVE EXAMPLES 5-9 TO 5-16

The fiber-bleaching test was carried out using the comparative maleic acid-based copolymers (1-1) to (1-8) in the same way as of Examples 5-23 to 5-44. Their results are shown in Table 26.

TABLE 25

(Evaluation as fiber-treating agents)

| Example | Maleic acid-based copolymer | Feeling* | Degree of whiteness (W value) | Sewability (number of base yarn-broken places) |
|---|---|---|---|---|
| 5-23 | (1-1) | ○ | 94.5 | 37 |
| 5-24 | (1-2) | ○ | 94.1 | 38 |
| 5-25 | (1-3) | ○ | 93.3 | 36 |
| 5-26 | (1-4) | ○ | 94.2 | 39 |
| 5-27 | (1-5) | ○ | 94.1 | 38 |
| 5-28 | (1-6) | ○ | 93.8 | 40 |
| 5-29 | (1-7) | ○ | 93.2 | 39 |
| 5-30 | (1-8) | ○ | 93.0 | 37 |
| 5-31 | (1-9) | ○ | 93.5 | 38 |
| 5-32 | (1-10) | ○ | 93.1 | 37 |
| 5-33 | (1-11) | ○ | 94.1 | 39 |
| 5-34 | (1-12) | ○ | 94.0 | 41 |
| 5-35 | (1-13) | ○ | 93.3 | 40 |
| 5-36 | (1-14) | ○ | 95.0 | 38 |
| 5-37 | (1-15) | ○ | 94.8 | 37 |
| 5-38 | (1-16) | ○ | 94.3 | 39 |
| 5-39 | (1-17) | ○ | 94.0 | 40 |
| 5-40 | (1-18) | ○ | 94.5 | 38 |
| 5-41 | (1-19) | ○ | 93.8 | 37 |
| 5-42 | (1-20) | ○ | 94.3 | 39 |

TABLE 25-continued (Evaluation as fiber-treating agents)

| Example | Maleic acid-based copolymer | Feeling* | Degree of whiteness (W value) | Sewability (number of base yarn-broken places) |
|---|---|---|---|---|
| 5-43 | (1-21) | ○ | 94.8 | 40 |
| 5-44 | (1-22) | ○ | 94.5 | 38 |

*Feeling:
soft ○
somewhat hard Δ
considerably hard x

TABLE 26

(Evaluation as fiber-treating agents)

| Comparative Example | Comparative maleic acid-based copolymer | Feeling* | Degree of whiteness (W value) | Sewability (number of base yarn-broken places) |
|---|---|---|---|---|
| 5-9 | (1-1) | Δ | 87.1 | 78 |
| 5-10 | (1-2) | x | 86.5 | 86 |
| 5-11 | (1-3) | Δ | 87.3 | 68 |
| 5-12 | (1-4) | x | 85.8 | 81 |
| 5-13 | (1-5) | Δ | 88.1 | 83 |
| 5-14 | (1-6) | Δ | 87.4 | 79 |
| 5-15 | (1-7) | x | 87.0 | 63 |
| 5-16 | (1-8) | Δ | 86.9 | 84 |

*Feeling:
soft ○
somewhat hard Δ
considerably hard x

EXAMPLES 5-45 TO 5-54 (evaluation as inorganic pigment-dispersing agents)

To evaluate performance of the maleic acid-based copolymers (1-1) to (1-10) as inorganic pigment-dispersing agents, the following test was carried out Into a beaker (material quality: SUS 304, inner diameter: 90 mm, height: 160 mm) having a capacity of 1 liter was placed 400 parts of filter press-dehydrated cake (solid content: 65.3%) of calcite type cubic light calcium carbonate (primary particle diameter: 0.15 μm) and to this were added 3.26 parts of a 40% aqueous solution of the maleic acid-based copolymer as a dispersing agent (the water-soluble polymer in an amount of 0.5% based on the weight of the calcium carbonate) and 6.9 parts of water for adjusting a solid content to mix the materials by kneading at a low speed for 3 minutes using a dissolver stirring wing (50 mm φ). Then, dispersing was carried out at 3,000 rpm for 10 minutes to obtain a water dispersion having a solid content of 64%. The viscosity of the water dispersion was measured using a B type viscometer at 25° C. just after dispersing and after standing at room temperature for 1 week, whereby a test of the stability over a period of time was carried out. Results of the measurement are shown in Table 27.

COMPARATIVE EXAMPLES 5-17 TO 5-24

The stability of water dispersions over a period of time was tested using the comparative maleic acid-based copolymers (1-1) to (1-8) in the same way as of Examples 5-45 to 5-54. Results of the measurement are shown in Table 28.

TABLE 27

(Evaluation as inorganic pigment-dispersing agents)

| Example | Maleic acid-based copolymer | Viscosity of water dispersion (cP) | |
|---|---|---|---|
| | | Just after dispersing | After standing at room temperature for 1 week |
| 5-45 | (1-1) | 320 | 390 |
| 5-46 | (1-2) | 310 | 380 |
| 5-47 | (1-3) | 370 | 410 |
| 5-48 | (1-4) | 350 | 390 |
| 5-49 | (1-5) | 380 | 410 |
| 5-50 | (1-6) | 360 | 400 |
| 5-51 | (1-7) | 420 | 430 |
| 5-52 | (1-8) | 410 | 450 |
| 5-53 | (1-9) | 430 | 470 |
| 5-54 | (1-10) | 350 | 390 |

(Footnote):
The viscosity was measured at 25° C. using a B type viscometer.

TABLE 28

(Evaluation as inorganic pigment-dispersing agents)

| Comparative Example | Comparative maleic acid-based copolymer | Viscosity of water dispersion (cP) | |
|---|---|---|---|
| | | Just after dispersing | After standing at room temperature for 1 week |
| 5-17 | (1-1) | 1480 | 1820 |
| 5-18 | (1-2) | 1020 | 1530 |
| 5-19 | (1-3) | 980 | 1200 |
| 5-20 | (1-4) | 8000 | *1 |
| 5-21 | (1-5) | 2800 | 3800 |
| 5-22 | (1-6) | 1280 | 1800 |
| 5-23 | (1-7) | 2300 | 2900 |
| 5-24 | (1-8) | 1310 | 2000 |

(Footnote):
The viscosity was measured at 25° C. using a B type viscometer.
*1: Measurement was impossible.

INDUSTRIAL APPLICATION

Since the maleic acid-based copolymer relating to one aspect of the present invention has a high calcium ion-capturability, a good clay-dispersibility and a low gelatability, the copolymer contributes toward strengthening the washing power of detergent compositions. The detergent composition containing this copolymer has high washing power and displays balanced abilities to both mud dirt and oil dirt.

In addition, since the maleic acid-based copolymer relating to another aspect of the present invention has a calcium ion-stabilization degree constant within the optimal range, a good level of adsorption to clay and a low gelatability, the copolymer contributes toward strengthening the washing power of detergent compositions. The detergent composition containing this copolymer displays high washing power particularly to mud dirt.

According to the production process of the present invention, the amount of residual monomers and hydrogen peroxide at completion of polymerization is small and the productivity is high. In addition, since the resulting maleic acid-based copolymer has a high calcium ion-capturability, a calcium ion-stabilization degree constant within the optimal range, a good clay-dispersibility, a good level of adsorption to clay and a low gelatability, this copolymer is preferably used for detergent compositions, inorganic pigment-dispersing agents, water-treating agents and fiber-treating agents.

The detergent composition of the present invention has high washing power and, particularly, is preferably used for clothes. In addition, this composition is effective for inhibiting the yellowing of fibers due to the presence of a slight amount of metals such as iron ions and zinc ions existing in washing liquids.

The inorganic pigment-dispersing agent of the present invention is used as the dispersing agent for inorganic pigments, such as heavy or light calcium carbonate and clay used for paper coating, and has a low viscosity, a high fluidity, and a good stability of these properties over a period of time.

The water-treating agent of the present invention is useful for inhibiting formation of scale in systems such as cooling water-circulating systems, boiler water-circulating systems, seawater desalination plants, pulp digesters and black liquor evaporators.

The fiber-treating agent of the present invention can be used in fiber-treating processes, such as scouring, dyeing, bleaching and soaping. The fibers for which the fiber-treating agent of the present invention can be used are, for example, cellulose fibers, such as cotton and hemp; chemical fibers, such as nylon and polyester; animal fibers, such as wool and silk; semisynthetic fibers such as rayon; and any fabric and blend thereof.

What is claimed is:

1. A process for inhibiting scale from forming in an aqueous solution, said process comprising the step of adding a water-treating agent which contains a maleic acid-based copolymer as an essential component into the aqueous solution, wherein said copolymer is a copolymer of maleic acid, maleic acid salt or mixtures thereof and a water soluble ethylenically unsaturated monomer in a molar ratio of 95/5 to 5/95 which was produced in the presence of a water soluble initiator, and wherein said copolymer has a weight-average molecular weight of about 1,000 to about 100,000, a calcium ion-capturability of about 300 mg $CaCO_3$/g or higher calculated as calcium carbonate, and a clay-dispersibility of about 1.2 or higher.

2. The process of claim 1, wherein said maleic acid-based copolymer has a weight-average molecular weight within the range of about 3,000 to about 15,000, a calcium ion-capturability of about 350 mg $CaCO_3$/g or higher, and a clay-dispersibility of about 1.4 or higher.

3. The process of claim 2, wherein said maleic acid-based copolymer has a calcium ion-capturability of about 400 mg $CaCO_3$/g or higher.

4. The process of claim 3, wherein said maleic acid-based copolymer further has a gelatability of about 0.2 or lower.

5. The process of claim 1, wherein said maleic acid-based copolymer further has a gelatability of about 0.2 or lower.

6. The process of claim 1, wherein said water-treating agent further contains at least one member selected from the group consisting of polymerized phosphoric salts, phosphoric acid salts, anticorrosive agents, slime controlling agents and chelating agents.

7. The process of claim 1, wherein said copolymer is produced by a process where the water soluble initiator is added to the maleic acid or salt before the addition of the ethylenically unsaturated monomer and the addition of the water soluble initiator is completed before the completion of the addition of the ethylenically unsaturated monomer.

8. A process for inhibiting scale from forming in an aqueous solution, comprising adding a water treating agent to an aqueous solution wherein said water treating agent comprises a maleic acid based copolymer, wherein said copolymer is a copolymer of maleic acid, maleic acid salt or mixtures thereof and a water soluble ethylenically unsaturated monomer in a molar ratio of 95/5 to 5/95, said copolymer produced in the presence of a water soluble initiator and having a weight-average molecular weight of about 1,000 to 100,000, a calcium ion capturability of about 300 mg $CaCO_3$/g or higher calculated as calcium carbonate, and a clay dispersibility of about 1.2 or higher, wherein said copolymer is obtained by a process of adding said water soluble initiator and said ethylenically unsaturated monomer with said maleic acid or salt thereof over a period of time, wherein the addition of said initiator is completed before the addition of the ethylenically unsaturated monomer is completed.

9. The process of claim 8, wherein said water soluble initiator is hydrogen peroxide.

10. The process of claim 8, wherein the addition of said ethylenically unsaturated monomer is completed 10 to 300 minutes later than the completion of the addition of said initiator.

11. The process of claim 8, wherein said initiator is included in the amount of 3% to 20% by weight based on the weight of said maleic acid or maleic acid salt.

12. The process of claim 8, wherein said maleic acid based copolymer is produced by the steps of charging said maleic acid or maleic acid salt into a reaction vessel, adding said water soluble initiator into said reaction vessel, and adding said water soluble ethylenically unsaturated monomer into said reaction vessel within 30 to 500 minutes after initiation of a reaction, wherein said adding of said ethylenically unsaturated monomer is completed 10 to 300 minutes later than completion of the addition of the initiator.

13. A process for inhibiting scale from forming in an aqueous solution, comprising adding a water treating agent to an aqueous solution, wherein said water treating agent comprises a maleic acid-based copolymer which has a calcium ion-capturability of about 300 mg $CaCO_3$ or higher calculated as calcium carbonate, and a clay dispersibility of about 1.2 or higher, wherein said copolymer is a copolymer of maleic acid, maleic acid salt or mixtures thereof and a water soluble ethylenically unsaturated monomer in a molar ratio of 95/5 to 5/95, said copolymer produced in the presence of a water soluble initiator and having a weight-average molecular weight of about 1,000 to 100,000, wherein said copolymer is obtained by a polymerization process of adding said water soluble initiator over a period of time to said maleic acid or salt thereof to initiate polymerization of said maleic acid or salt thereof, and thereafter adding said ethylenically unsaturated monomer to said maleic acid or salt thereof to produce said copolymer.

14. The process of claim 13, wherein said water soluble initiator is hydrogen peroxide.

15. A process for inhibiting scale from forming in an aqueous solution, comprising adding a water treating agent to an aqueous solution, wherein said water treating agent comprises a maleic acid-based copolymer having a calcium ion-capturability of about 300 mg $CaCO_3$ or higher calculated as calcium carbonate, and a clay dispersibility of about 1.2 or higher, wherein said copolymer is a copolymer of maleic acid, maleic acid salt or mixtures thereof and a water soluble ethylenically unsaturated monomer in a molar ratio of 95/5 to 5/95, said copolymer produced in the presence of a water soluble initiator and having a weight-average molecular weight of about 1,000 to 100,000, wherein said copolymer is obtained by a process of adding said ethylenically unsaturated monomer and initiator over a period of time to said maleic acid or salt thereof in a reaction vessel to produce said copolymer, wherein polymerization of said maleic acid or salt thereof is initiated at the beginning of said adding step to initiate polymerization of said maleic acid or salt when the amount of said ethylenically unsaturated monomer in said vessel is less than the amount of said maleic acid or salt thereof, with the proviso that when said initiator is added before adding said ethylenically unsaturated monomer, the addition of the initiator and the ethylenically unsaturated monomer is completed simultaneously, and when the initiator and ethylenically unsaturated monomer are added simultaneously, the initiator is completed before the completion of the addition of the ethylenically unsaturated monomer.

* * * * *